US006893722B2

(12) United States Patent  
McGee

(10) Patent No.: US 6,893,722 B2  
(45) Date of Patent: May 17, 2005

(54) CATIONIC, AMINO-FUNCTIONAL, ADHESION-PROMOTING POLYMER FOR CURABLE INKS AND OTHER PLASTIC FILM COATINGS, AND PLASTIC FILM COMPRISING SUCH POLYMER

(75) Inventor: Dennis E. McGee, Penfield, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 219 days.

(21) Appl. No.: 10/134,969

(22) Filed: Apr. 29, 2002

(65) Prior Publication Data

US 2003/0207121 A1 Nov. 6, 2003

(51) Int. Cl.$^7$ ............................................. B32B 27/30

(52) U.S. Cl. .................... 428/422.8; 428/500; 524/801; 524/804; 524/812

(58) Field of Search ............................. 428/500, 422.8; 524/801, 804, 812

(56) References Cited

U.S. PATENT DOCUMENTS

| | | | |
|---|---|---|---|
| 2,759,913 A | 8/1956 | Hulse | 260/89.7 |
| 3,753,769 A | 8/1973 | Steiner | 428/331 |
| 4,194,039 A | 3/1980 | Mueller | 428/213 |
| 4,214,039 A | 7/1980 | Steiner et al. | 428/414 |
| 4,223,115 A | 9/1980 | Zalucha et al. | 525/455 |
| 4,308,189 A | 12/1981 | Moritani et al. | 260/29.6 WA |
| 4,333,968 A | 6/1982 | Nahmias | 427/173 |
| 4,377,616 A | 3/1983 | Ashcraft et al. | 428/213 |
| 4,386,129 A | 5/1983 | Jacoby | 428/215 |
| 4,421,823 A | 12/1983 | Theisen et al. | 428/349 |
| 4,439,493 A | 3/1984 | Hein et al. | 428/414 |
| 4,447,494 A | 5/1984 | Wagner, Jr. et al. | 428/349 |
| 4,546,140 A | 10/1985 | Shih | 524/394 |
| 4,572,854 A | 2/1986 | Dallmann et al. | 206/524.1 |
| 4,582,752 A | 4/1986 | Duncan | 428/317.9 |
| 4,610,914 A | 9/1986 | Newsome | 428/216 |
| 4,615,926 A | 10/1986 | Hsu et al. | 428/35.2 |
| 4,629,657 A | 12/1986 | Gulati et al. | 428/461 |
| 4,632,869 A | 12/1986 | Park et al. | 428/315.5 |
| 4,652,489 A | 3/1987 | Crass et al. | 428/337 |
| 4,677,017 A | 6/1987 | DeAntonis et al. | 428/215 |
| 4,704,314 A | 11/1987 | Hsu et al. | 428/95 |
| 4,716,061 A | 12/1987 | Winter | 428/34.3 |
| 4,755,419 A | 7/1988 | Shah | 428/220 |
| 4,758,462 A | 7/1988 | Park et al. | 428/213 |
| 4,801,640 A | 1/1989 | Dallmann et al. | 524/394 |
| 4,828,928 A | 5/1989 | Shah | 428/518 |
| 4,853,602 A | 8/1989 | Hommes et al. | 318/38 |
| 4,865,908 A | 9/1989 | Liu et al. | 442/398 |
| 4,879,177 A | 11/1989 | Boice | 428/339 |
| 4,906,517 A | 3/1990 | Akao et al. | 428/216 |
| 4,927,689 A | 5/1990 | Markiewicz | 428/34.8 |
| 4,927,690 A | 5/1990 | Welsh | 428/35.7 |
| 4,938,683 A | 7/1990 | Boice | 428/517 |

(Continued)

FOREIGN PATENT DOCUMENTS

| | | |
|---|---|---|
| CN | 1131611 | 9/1996 |
| CN | 1282750 | 2/2001 |
| DE | 3610644 | 10/1986 |
| DE | 4420991 | 12/1995 |
| EP | 632095 A2 | 1/1995 |
| EP | 790275 A1 | 8/1997 |
| EP | 589033 B1 | 3/1998 |
| EP | 865909 A1 | 9/1998 |
| EP | 865910 A1 | 9/1998 |
| EP | 865911 A1 | 9/1998 |
| EP | 865912 A1 | 9/1998 |
| EP | 865913 A1 | 9/1998 |
| EP | 865914 A1 | 9/1998 |
| EP | 887375 A1 | 12/1998 |
| EP | 962489 A2 | 12/1999 |
| EP | 967671 A2 | 12/1999 |
| EP | 492942 B1 | 2/2000 |
| EP | 790262 B1 | 5/2000 |
| EP | 557721 B1 | 10/2000 |
| EP | 632095 B1 | 9/2001 |
| EP | 68206 B2 | 1/2002 |
| EP | 1167404 A1 | 1/2002 |
| JP | 56067376 | 6/1981 |
| JP | 62195030 | 8/1987 |
| JP | 3166234 | 7/1991 |
| JP | 3187742 | 8/1991 |
| JP | 3187746 | 8/1991 |
| JP | 4122736 | 4/1992 |
| JP | 5255551 | 10/1993 |
| JP | 7148837 | 6/1995 |
| JP | 7149967 | 6/1995 |
| JP | 8067760 | 3/1996 |
| JP | 8142286 | 6/1996 |
| JP | 8183873 | 7/1996 |
| JP | 9176352 | 7/1997 |
| JP | 9194650 | 7/1997 |
| WO | WO 95/30708 | 11/1995 |
| WO | WO 97/10300 | 3/1997 |
| WO | WO 97/11115 | 3/1997 |
| WO | WO 97/22470 | 6/1997 |
| WO | WO 01/98372 | 12/2001 |
| WO | WO 01/98409 | 12/2001 |
| WO | WO 02/094886 A1 | 11/2002 |
| ZA | 970523 | 1/1997 |

OTHER PUBLICATIONS

F. Möller, Houben–Weyl, vol. 11/1 (1957), pp. 277–280.

Primary Examiner—Monique R. Jackson  
(74) Attorney, Agent, or Firm—Rick James

(57) ABSTRACT

A cationically stabilizable amino-functional polymer having a number-average molecular weight of >3000, exists in the presence of water as a solution or stable emulsion only when the pH is ≦8. Upon drying the polymer contains ethenically unsaturated moieties selected from the group consisting of acrylic, methacrylic, and enamine. The polymer is useful to promote adhesion of curable inks and other coatings for plastic film. The invention further relates to a plastic film comprising such polymer.

39 Claims, 4 Drawing Sheets

U.S. PATENT DOCUMENTS

| | | | |
|---|---|---|---|
| 4,946,743 A | 8/1990 | Winter | 428/349 |
| 4,961,992 A | 10/1990 | Balloni et al. | 428/332 |
| 4,975,469 A | 12/1990 | Jacoby et al. | 521/84.1 |
| 5,019,447 A | 5/1991 | Keller | 428/327 |
| 5,023,143 A | 6/1991 | Nelson | 428/516 |
| 5,057,177 A | 10/1991 | Balloni et al. | 156/244.11 |
| 5,064,716 A | 11/1991 | Chou et al. | 428/336 |
| 5,126,197 A | 6/1992 | Schinkel et al. | 428/349 |
| 5,128,205 A | 7/1992 | Butler | 428/331 |
| 5,134,174 A | 7/1992 | Xu et al. | 521/143 |
| 5,151,309 A | 9/1992 | Dollinger | 428/41.2 |
| 5,169,712 A | 12/1992 | Tapp | 428/315.5 |
| 5,176,953 A | 1/1993 | Jacoby et al. | 428/315.5 |
| 5,194,324 A | 3/1993 | Poirier | 428/315.5 |
| 5,209,972 A | 5/1993 | Super et al. | 428/349 |
| 5,230,963 A | 7/1993 | Knoerzer | 428/520 |
| 5,231,126 A | 7/1993 | Shi et al. | 524/296 |
| 5,236,963 A | 8/1993 | Jacoby et al. | 521/92 |
| 5,254,631 A | 10/1993 | Yamamoto et al. | 525/278 |
| 5,296,530 A | 3/1994 | Bors et al. | 524/558 |
| 5,310,584 A | 5/1994 | Jacoby et al. | 428/2 |
| 5,317,035 A | 5/1994 | Jacoby et al. | 521/143 |
| 5,380,587 A | 1/1995 | Musclow et al. | 428/353 |
| 5,382,473 A | 1/1995 | Musclow et al. | 428/353 |
| 5,407,751 A | 4/1995 | Genske et al. | 428/516 |
| 5,468,440 A | 11/1995 | McAlpin et al. | 264/291 |
| 5,491,188 A | 2/1996 | Ikeda et al. | 524/229 |
| 5,498,659 A | 3/1996 | Esser | 524/549 |
| 5,516,475 A | 5/1996 | Wilson | 264/173.14 |
| 5,521,266 A | 5/1996 | Lau | 526/200 |
| 5,525,662 A | 6/1996 | Lavoie et al. | 524/558 |
| 5,529,834 A | 6/1996 | Tsai et al. | 428/215 |
| 5,547,764 A | 8/1996 | Blais et al. | 428/461 |
| 5,585,193 A | 12/1996 | Josephy et al. | 428/515 |
| 5,591,530 A | 1/1997 | Warner et al. | 428/480 |
| 5,594,070 A | 1/1997 | Jacoby et al. | 525/88 |
| 5,616,764 A | 4/1997 | Lavoie et al. | 556/482 |
| 5,617,707 A | 4/1997 | Simmons | 53/441 |
| 5,627,226 A | 5/1997 | Lustiger et al. | 524/90 |
| 5,662,985 A | 9/1997 | Jensen et al. | 428/195 |
| 5,667,902 A | 9/1997 | Brew et al. | 428/518 |
| 5,681,922 A | 10/1997 | Wolfschwenger et al. | 528/486 |
| 5,716,715 A | 2/1998 | Degrassi et al. | 428/475.8 |
| 5,716,998 A | 2/1998 | Munakata et al. | 521/58 |
| 5,725,962 A | 3/1998 | Bader et al. | 428/515 |
| 5,733,615 A | 3/1998 | Rackovan et al. | 428/35.7 |
| 5,753,363 A | 5/1998 | Bader et al. | 428/331 |
| 5,789,123 A | 8/1998 | Cleckner et al. | 430/18 |
| 5,811,121 A | 9/1998 | Wu et al. | 424/468 |
| 5,858,552 A | 1/1999 | Bader et al. | 428/516 |
| 5,885,721 A | 3/1999 | Su et al. | 428/516 |
| 5,891,555 A | 4/1999 | O'Brien | 428/213 |
| 5,895,694 A | 4/1999 | Zavadsky et al. | 428/36.7 |
| 5,919,547 A | 7/1999 | Kocher et al. | 428/138 |
| 5,972,496 A | 10/1999 | Bader et al. | 428/331 |
| 6,004,682 A | 12/1999 | Rackovan et al. | 428/518 |
| 6,005,034 A | 12/1999 | Hayashida et al. | 524/117 |
| 6,025,059 A | 2/2000 | McGee et al. | 428/219 |
| 6,033,758 A | 3/2000 | Kocher et al. | 428/138 |
| 6,072,005 A | 6/2000 | Kobylivker et al. | 525/240 |
| 6,087,015 A | 7/2000 | Cretekos et al. | 428/447 |
| 6,177,144 B1 | 1/2001 | Kranig et al. | 427/519 |
| 6,183,856 B1 | 2/2001 | Amon | 428/318.4 |
| 6,194,060 B1 | 2/2001 | Amon et al. | 428/315.9 |
| 6,218,013 B1 | 4/2001 | Wood et al. | 428/411.1 |
| 6,231,975 B1 | 5/2001 | Kong et al. | 428/355 EN |
| 6,235,823 B1 | 5/2001 | Ikeda et al. | 524/229 |
| 6,248,442 B1 | 6/2001 | Kong et al. | 428/355 EN |
| 6,287,700 B1 | 9/2001 | Kong et al. | 428/447 |
| 6,297,328 B1 | 10/2001 | Collins et al. | 525/379 |
| 6,303,233 B1 | 10/2001 | Amon et al. | 428/516 |
| 6,316,067 B1 | 11/2001 | Edwards et al. | 428/34.9 |
| 6,372,866 B2 * | 4/2002 | Tamazawa et al. | 526/75 |
| 6,596,379 B2 * | 7/2003 | McGee | 428/520 |

* cited by examiner

Main Effects Plot - Data Means for 3X-UV-Blk-Am

Main Effects Plot - Data Means for 23dA-Blkw

Main Effects Plot - Data Means for 7dH-Blkw

CATIONIC, AMINO-FUNCTIONAL, ADHESION-PROMOTING POLYMER FOR CURABLE INKS AND OTHER PLASTIC FILM COATINGS, AND PLASTIC FILM COMPRISING SUCH POLYMER

CROSS REFERENCE TO RELATED APPLICATIONS

This application is related in subject matter to U.S. Ser. No. 09/864,518, filed May 24, 2001 (RMH10184), and U.S. Ser. No. 09/828,638, filed Apr. 6, 2001 (RMH10185), whose entire contents are incorporated herein by reference.

FIELD OF THE INVENTION

The present invention relates to novel adhesion-promoting polymeric coatings and plastic substrates comprising such coatings, as well as methods for preparing same.

BACKGROUND OF THE INVENTION

Typically, in the production of emulsion polymers by free-radical polymerization, it has been a common practice to use nonionic or anionic materials to stabilize the emulsions. Alternatively, others have used protective colloids like poly(vinyl alcohol) [PVOH], hydroxyethyl cellulose, or derivatives thereof, either singly or in combination, to stabilize aqueous emulsion polymers. These stabilizers produce emulsion particles that are electrically neutral or negatively charged in an aqueous environment.

Commercially produced emulsions that contain positively charged particles (that is, cationic emulsions) are known, but are far fewer in number. For example, U.S. Pat. No. 5,521,266 to Lau discloses the synthesis of cationic emulsions, but requires complexation of water-insoluble monomers with macromolecular carbohydrates (for example, cyclodextrin, cyclodextrin derivative, cycloinulohexose, cycloinuloheptose, cycloinuloctose, calyxarene and cavitand) having a hydrophobic cavity.

U.S. Pat. No. 4,308,189 to Moritani et al. reviews many conventional techniques for producing cationic emulsions using low-molecular-weight cationic emulsifiers such as laurylamine salt, octadecylamine salt, laurylpyridinium chloride, and others that are toxic and subject to stringent regulations. The '189 patent also describes the use of cationic initiators and monomers to create cationic emulsions.

U.S. Pat. No. 5,254,631 to Yamamoto et al. discloses cationically electrodepositable, finely divided gelled polymers (that is, internally cross-linked polymer particles that do not coalesce into a film upon drying) having a core-sheath structure obtained by emulsion polymerization.

So, there are few processes that yield stable emulsions and none that offer satisfactory performance properties in applications that require film formation on and adhesion to plastic film or adhesion to inks after prolonged exposure to water or solvents like isopropyl alcohol (IPA).

For example, U.S. Pat. No. 4,214,039 to Steiner et al. discloses a cationic polymer as a primer for vinylidene chloride polymers used as coatings for oriented polypropylene packaging films. The primer comprises an epoxy resin composition comprising a) a liquid epoxy resin, e.g., one based on Bisphenol A, preferably emulsified or dissolved in water, and b) a water-soluble, amine-modified acrylic resin. This system, also employed at higher coating weights in U.S. Pat. No. 6,025,059 to McGee et al., lacks shelf stability.

Once the ingredients are mixed, the ingredients start to react. The useful pot life of the mixture of the '059 patent is no more than about 3 days. After this, the mixture gels or agglomerates, with precipitation of components. Moreover, undesired blocking can occur at coating weights below 0.25 grams/1000 in$^2$ (g/msi). In addition, ink adhesion problems can occur during printing with black UV-curable screen ink. Finally, the formulation may contain amounts of up to 10–20 wt. % propylene glycol monomethyl ether, which may require certain precautions in handling and use on a commercial scale.

Typically, films prepared for use as label facestock are coated on the printing side with a coating, which enhances ink adhesion. For instance, U.S. Pat. No. 5,380,587 to Musclow et al. discloses a multilayer packaging or label stock film having excellent printability and non-blocking characteristics. The film is first primed and then coated with copolyester coating.

Another ink adhesion enhancing coating is described in U.S. Pat. No. 5,382,473 to Musclow et al. which discloses a multilayer film structure with a prime coating which is the reaction product of acidified aminoethylated vinyl polymer and epoxy resin, top coated with polyester ink base to eliminate blocking.

U.S. Pat. No. 5,662,985 to Jensen et al. discloses a two-side coated label which comprises a polymeric film substrate having on a first surface thereof (A) an adhesive anchor layer and on a second surface thereof (B) an ink base layer, the (A) and (B) layers being selected from the group consisting of: (i) a prime coating having on an external surface a functional coating of an interpolymer of (a) an alpha, beta-monoethylenically unsaturated carboxylic acid; and (b) a neutral monomer ester comprising an alkyl acrylate ester and an alkyl methacrylate ester; and (ii) an iminated polymer; or the (A) adhesive anchor layer being selected from the group consisting of: (iii) a mixture of the functional coating of (i) and the iminated polymer of (ii); (iv) a linear water dissipatable polyester condensation product; and (v) a polyester; or the (B) ink base layer being selected from the group consisting of: (vi) a prime coating having on an external surface a functional coating of an acrylic copolymer; and (vii) a prime coating having on an external surface a functional coating of a styrene copolymer, provided that each of the (A) adhesive anchor layer and the (B) ink base layer is different. This invention offers excellent adhesion to most inks, but lacks resistance to IPA and blushes when the coated film is exposed to hot water.

One-package aqueous "latices" containing alkaline-curable self-cross-linking polymers are disclosed in U.S. Pat. No. 4,546,140 to Shih. These cationic polymer emulsions were stabilized by cationic monomers and nonionic surfactants. Shih's invention requires the presence of a salt of an organic carboxylic acid to cure polymerized acrylic esters containing a halohydrin and/or a quaternary ammonium salt. Shih's emulsions do not contain epoxy-functional monomers.

U.S. Pat. No. 5,296,530 to Bors et al. discloses polymers containing pendant acetoacetoxy groups maintained at relatively high pH values of >9 prior to application on a substrate.

U.S. Pat. No. 5,525,662 to Lavoie et al. discloses nonionic and anionic stabilizers for polymers containing acetoacetoxy-functional polymers. This reference teaches that unless the acetoacetoxy moiety is converted into an enamine in the wet state (at pH values >9), the acetoxy group will hydrolyze at any pH, especially when heated.

U.S. Pat. No. 5,811,121 to Wu et al. relates to pH-sensitive coatings comprising cellulose acetoacetate esters used in controlled release of active agents, e.g., in pharmaceuticals. Extrapolation of data by Wu et al. (U.S. Pat. No. 5,811,121) shows that at pH 7, acetoaceoxy-functional cellulose will have the acetoxyacetoxy group completely hydrolyzed within a week at pH 7. In many applications, however, it would be useful to provide an acetoacetoxy-functional coating that is stable at room temperature for at least several weeks at pH values between 4 and 7.

U.S. Pat. No. 5,498,659 to Esser discloses water-based polymeric formulations in which the polymer contains acetoacetoxy functionality and requires the use of a non-polymeric amine and a polymeric component that has both acid-functional and acetoacetoxy-type functional moieties.

U.S. Pat. No. 6,297,328 to Collins et al. discloses a surfactant-containing, enamine-functional polymer comprising the reaction product of a surfactant-containing acetoacetoxy-functional (AcAc) polymer and ammonia, a primary amine, a secondary amine or a poly(alkylenimine), for example PEI, that is, poly(ethylene imine), or other amines that are water-soluble and stable at pH values >8. Collins et al. disclose a surfactant-containing acetoacetoxy-functional polymer which is a reaction product of a non-acid vinyl monomer having an acetoacetoxy-type functionality, for example acetoacetoxy ethylmethacrylate (AAEM), and at least one non-self polymerizing, ethylenically-unsaturated surfactant monomer. The disclosure further recommends preparing AcAc polymer emulsion in the presence of non-ionic and anionic emulsifiers.

All of the foregoing U.S. patents are incorporated herein by reference.

The development of commercially acceptable coated plastic films for printing applications, e.g., printable labels, is often a compromise between a variety of desired properties. Labels used for beverage containers, or health and beauty containers, should be capable of exposure to severe conditions encountered during manufacturing, transport and storage. Thus printable coatings for plastic films should exhibit hot-water resistance, organic-solvent resistance, e.g., IPA resistance, abrasion resistance, and haze resistance on exposure to hot or cold water. At the same time, the coating should be receptive to ink so as to provide good adhesion of the ink to the coated film immediately after printing. The ink should stay adhered to the coated film after a label is made and applied to a beverage container that is exposed to hot or cold water and subsequent abrasion encountered in mechanized handling.

Non-cross-linked polymer constituents of coatings tend to increase in haze upon exposure to boiling water and may be completely soluble and removed upon exposure to IPA. In addition, after ink is applied and the label exposed to water and abrasion simulating a bottling line, the ink will abrade off the label. Coatings can be made resistant to hot water or chemicals by cross-linking polymers in the coating. However, when cross-linked, coatings are generally less receptive to inks, losing the ability to have good ink adhesion immediately after printing, especially at high printing speeds and low temperature. Even where such coatings are resistant to IPA and show robust printing performance with a wide variety of inks, including UV-curable inks, field testing has revealed certain shortcomings, e.g., suitability after aging. This is particularly true where the coated film samples are heat-aged as opposed to being aged at ambient temperature. Heat aging is associated with increased cross-linking.

It would be highly desirable to provide stable cationic emulsions that allow sufficient design flexibility to create useful coatings for plastic film, e.g., a coating composition that exhibits a chemically resistant, printable surface such that the coated product can be used as a label that exhibits both acceptable solvent resistance properties and ink adhesion properties, particularly adhesion to UV-curable screen inks and electron beam-curable (EB-curable) screen inks. Moreover, it would be desirable that such a coating composition resists blocking at low coating weights, which are economically favorable. Furthermore, it would be desirable to have stable cationic emulsion polymers that could be formulated with additives to enhance adhesion to particular substrates or inks or to impart color, texture (a matte finish or paper-like appearance), anti-static properties, and/or security features. Finally, it would be useful to provide such polymer coatings that provide good ink adhesion even after heat aging.

SUMMARY OF THE INVENTION

In a broad aspect, the present invention relates to a cationically stabilizable amino-functional polymer having a number-average molecular weight of >3000, which exists in the presence of water as a solution or stable emulsion only when the pH is $\leq 8$, and which upon drying contains ethenically unsaturated moieties selected from the group consisting of acrylic, methacrylic, and enamine.

In another aspect, the invention relates to a mixture comprising the above-described amino-functional polymer and at least one additional polymer selected from the group consisting of nonionic polymer and cationic polymer.

In yet another aspect, the present invention relates to a dryable mixture comprising a cationically stabilizable amino-functional polymer having a number-average molecular weight of >3000, which exists in the presence of water as a stable emulsion only when the pH is $\leq 8$, which emulsion is unstable in hydrophilic solvent-based systems at pH values >8 and which upon drying contains ethenically unsaturated moieties selected from the group consisting of acrylic, methacrylic, and enamine. Removal of water from the amino-functional polymer shifts equilibria to favor the formation of ethenic unsaturation via condensation when the emulsion is dried in the presence of an unsaturation number enhancer element.

In yet another aspect, the present invention relates to a coating composition comprising a) 70 to 99 wt. % of the amino-functional polymer as described above; and b) 1 to 30 wt. % of an unsaturation enhancer element.

In still another aspect, the present invention relates to a plastic film that comprises A) a plastic substrate and B) a coating comprising the coating composition as described above.

In still yet another aspect, the present invention relates to a curable mixture comprising i) polymeric amine having a number-average molecular weight of >3000 and covalently bonded side chains of at least one of a) ethenically unsaturated moieties selected from the group consisting of acrylic, methacrylic, and enamine, and b) precursors of ethenically unsaturated moieties selected from the group consisting of 2-hydroxy-3-chloropropylacrylate, glycidyl methacrylate (GMA), glycidyl acrylate, acetoacetoxyethyl methacrylate (AAEM), acetoacetoxyethyl acrylate, acetoacetoxy (methyl)ethyl acrylate, acetoacetoxypropyl acrylate, acetoacetamidoethyl acrylate, acetoacetamidoethyl methacrylate, and acetoacetoxybutyl acrylate; ii) epoxy cross-linking catalyst; and iii) cross-linking agent.

DESCRIPTION OF THE PREFERRED EMBODIMENTS

Figure 1:
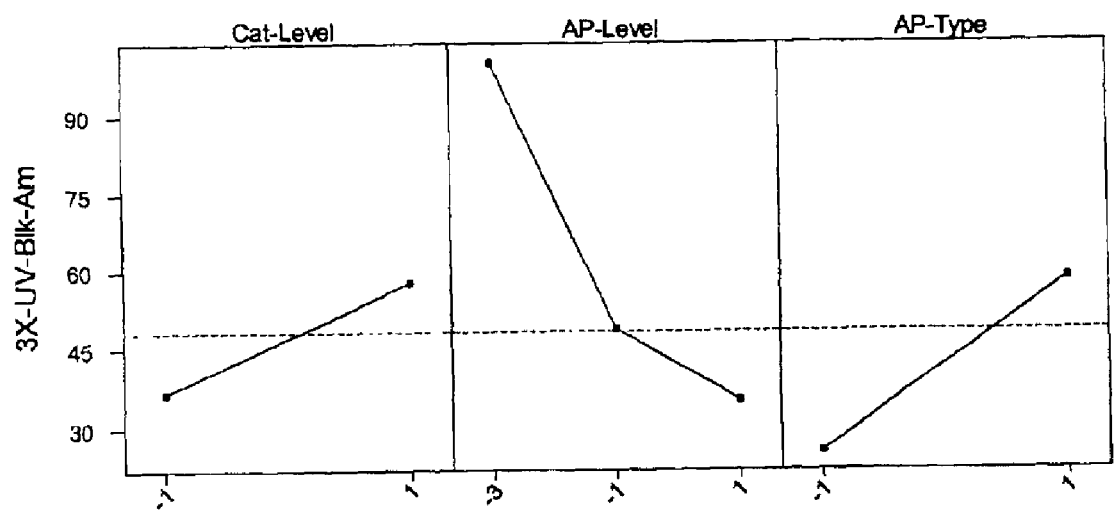
FIG. 1 depicts the main effects of coating design variables on ink adhesion after samples were ambient aged for one week, printed with black UV-curable screen ink, and passed under a UV light three times to cure the ink. The coating formulations contained materials expected to be adhesion promoters (AP-Type), which were covalent adducts of glycidyl methacrylate (GMA) and poly(ethylene imine) [PEI] that theoretically contained up to 4230 microequivalents ethenic unsaturation per dry gram. The formulated printable coatings were epoxy-functional cationic polymers that contained up to 850 microequivalents ethenic unsaturation per gram of dried coating. Although improvements were observed when using a curing catalyst for the epoxy functional cationic polymer, as well as when using an additive containing more GMA, the best ink adhesion was unexpectedly seen in samples lacking the expected adhesion promoters.

In one aspect, the present invention relates to a cationically stabilizable amino-functional polymer having a number-average molecular weight of >3000, which exists in the presence of water as a solution or stable emulsion only when the pH is $\leq 8$, and which upon drying contains ethenically unsaturated moieties selected from the group consisting of acrylic, methacrylic, and enamine. In one embodiment of this aspect, the present invention relates to an amino-functional polymer as described above, which further, is a condensation product of a reaction between an amino-functional polymer comprising reactive amine hydrogens with an element selected from the group consisting of halo-functional monomer, halo-functional oligomer, carbonyl-functional monomer, carbonyl-functional oligomer, epoxy-functional monomer, epoxy-functional oligomer, poly-functional acrylic monomer, poly-functional acrylic oligomer, poly-functional methacrylic monomer, and poly-functional methacrylic oligomer, said element containing or forming upon drying an ethenically unsaturated moiety selected from the group consisting of acrylic, methacrylic, and enamine. In an embodiment of this aspect of the present invention, said element is selected from the group consisting of 2-hydroxy-3-chloropropylacrylate, glycidyl methacrylate (GMA), glycidyl acrylate, and acetoacetoxyethyl methacrylate (AAEM).

In another embodiment of this aspect of the present invention, the amino-functional polymer comprises an amino-functional styrenated acrylic polymer with a number-average molecular weight ranging from 5,000 to 80,000 daltons, say, 8,000 to 20,000 daltons and a weight-average molecular weight of 10,000 to 200,000 daltons, say, 15,000 to 50,000 daltons.

In yet another embodiment of this aspect of the present invention, said element is present in an amount sufficient to consume >50% of reactive amine hydrogens of said amino-functional polymer. In still another embodiment, said element is present in an amount sufficient to consume $\geq 90\%$ of said reactive amine hydrogens of the amino-functional polymer.

In another aspect of the invention, the amino-functional polymer is soluble in hydrophilic solvent at pH values <8. In an embodiment of this aspect, the amino-functional polymer can have at least some ethenic unsaturation covalently bonded to the polymer before drying.

Another aspect of the invention relates to a mixture which comprises the above amino-functional polymer which can have at least some ethenic unsaturation covalently bonded to the polymer before drying, and at least one additional polymer selected from the group consisting of nonionic polymer and cationic polymer. A preferred embodiment of this mixture further comprises at least one element selected from the group consisting of cross-linker, epoxy curing catalyst, coating process-facilitating adjuvant, cationic wax dispersion, nonionic wax dispersion, nonionic slip additive, cationic slip additive, cationic colloidal silica, mineral filler, plastic pigment, anti-static additive, UV absorber, UV stabilizer, biocide, and security taggant. In one embodiment, the cross-linker comprises at least one element selected from the group consisting of

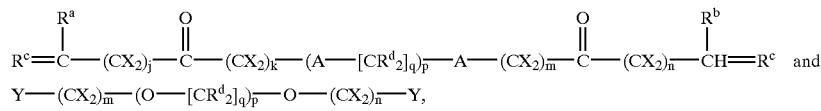

where Y is selected from the group consisting of halogen and three-membered oxirane ring, $R^a$ and $R^b$ are the same or different and selected from the group consisting of H and $C_1$ to $C_6$ alkyl, $R^c$ is selected from the group consisting of O and $CX_2$, each X can be the same or different and is selected from the group consisting of H, hydroxyl, and halogen, $R^d$ is selected from the group consisting of H, hydroxyl, halogen, and any organic radical containing at least one carbon atom, wherein each $R^d$ can be the same or different within the same molecule, A is selected from the group consisting of O and $NR^d$, $CR^d$ and $CR^d_2$ can each be a separate moiety or a portion of a cyclic structure, j, k, m and n are integers ranging from 0 to 6, q is an integer ranging from 1 to 6, inclusive, and p is an integer ranging from 0 to 30, inclusive. In another embodiment of this aspect, the additional polymer is a cationically stabilizable emulsion polymer with a calculated glass transition temperature that is <35° C. that comprises on a dry basis: i) 3 to 70 wt. % of at least one water-soluble polymeric compound having a number-average molecular weight >5000 which comprises a moiety selected from the group consisting of primary amines and secondary amines; and ii) 30 to 97 wt. % of a blend of vinylic, non-acidic monomers which are uncharged or positively charged in an aqueous solution having a pH between 1 and 8, which vinylic, non-acidic monomers include a) a nitrogen-containing monomer, b) a monomer that is either epoxy-functional or carbonyl-functional, and c) an acrylic or methacrylic ester.

In a preferred embodiment, a) is selected from the group consisting of acrylonitrile and methacrylonitrile, b) is selected from the group consisting of glycidyl methacrylate, glycidyl acrylate, acetoacetoxyethyl methacrylate, acetoacetoxyethyl acrylate, acetoacetoxy (methyl)ethyl acrylate, acetoacetoxypropyl acrylate, acetoacetamidoethyl acrylate, acetoacetamidoethyl methacrylate, and acetoacetoxybutyl acrylate, and c) is selected from the group consisting of acrylate ester and methacrylate ester, said esters being made from alcohols of 1 to 8 carbon atoms.

In yet another embodiment, the blend of vinylic, non-acidic monomers comprises 5 to 25% a), 5 to 20% b), and 55 to 90% c), such that the calculated glass transition temperature of said additional polymer upon drying is <25° C. before cross-linking.

In still another aspect, the present invention relates to a cationically stabilizable amino-functional polymer having a number-average molecular weight of >3000, which exists in the presence of water as a stable emulsion only when the pH is ≦8, and which upon drying contains ethenically unsaturated moieties selected from the group consisting of acrylic, methacrylic, and enamine, wherein the amino-functional polymer forms a hydrophilic solvent-based emulsion at pH values ≦8 and is unstable in hydrophilic solvent-based systems at pH values >8. For present purposes, hydrophilic solvents are those which are soluble in water, including, e.g., water, water-soluble alcohols, glycols and glycol ethers. In one embodiment of this aspect, removal of water from the amino-functional polymer shifts equilibria to favor the formation of ethenic unsaturation via condensation when said emulsion is dried in the presence of an unsaturation number enhancer element selected from the group consisting of

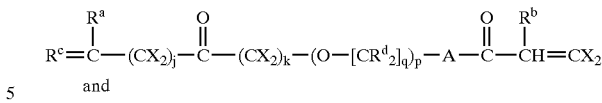

and

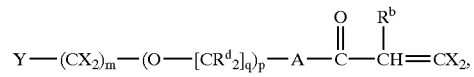

where Y is selected from the group consisting of halogen and three-membered oxirane ring, $R^a$ and $R^b$ are the same or different and selected from the group consisting of H and $C_1$ to $C_6$ alkyl, $R^c$ is selected from the group consisting of O and $CX_2$, each X can be the same or different and is selected from the group consisting of H, hydroxyl, and halogen, $R^d$ is selected from the group consisting of H, hydroxyl, halogen, and any organic radical containing at least one carbon atom, wherein each $R^d$ can be the same or different, A is selected from the group consisting of O and $NR^d$, $CR^d$ and $CR^d_2$ can each be a separate moiety or a portion of a cyclic structure, j, k, and m are integers ranging from 0 to 6, inclusive, q is an integer ranging from 1 to 6, inclusive, and p is an integer ranging from 0 to 30, inclusive.

In yet another aspect of the invention, the present invention relates to a dryable mixture comprising the immediately above-described amino-functional polymer, and an unsaturation number enhancer element that forms ethenic unsaturation within said amino-functional polymer upon drying. In one embodiment, the dryable mixture further comprises at least one element selected from the group consisting of cationic polymer, nonionic polymer, cross-linker, epoxy curing catalyst, coating process-facilitating adjuvant, cationic wax dispersion, nonionic wax dispersion, nonionic slip additive, cationic slip additive, cationic colloidal silica, mineral filler, plastic pigment, anti-static additive, UV absorber, UV stabilizer, biocide, and security taggant. In another embodiment of this dryable mixture, the cross-linker comprises at least one element of the following group of structures:

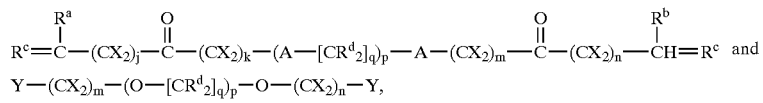

where Y is selected from the group consisting of halogen and three-membered oxirane ring, $R^a$ and $R^b$ are the same or different and selected from the group consisting of H and $C_1$ to $C_6$ alkyl, $R^c$ is selected from the group consisting of O and $CX_2$, each X can be the same or different and is selected from the group consisting of H, hydroxyl, and halogen, $R^d$ is selected from the group consisting of H, hydroxyl, halogen, and any organic radical containing at least one carbon atom, wherein each $R^d$ can be the same or different within the same molecule, A is selected from the group consisting of O and $NR^d$, $CR^d$ and $CR^d_2$ can each be a separate moiety or a portion of a cyclic structure, j, k, m and n are integers ranging from 0 to 6, q is an integer ranging from 1 to 6, inclusive, and p is an integer ranging from 0 to 30, inclusive. In another embodiment of the invention, in the cross-linker, Y is a three-membered oxirane ring, A is oxygen, X and $R^d$ are hydrogen, $R^a$ and $R^b$ are the same or different and are selected from hydrogen or methyl, $R^c$ is oxygen, n is equal to 1, q is equal to 2, m equals 1 or 2, and p is $\leq 10$. In another embodiment of the dryable mixture, in the unsaturation number enhancer element (which is an adhesion-promoting element in this embodiment), Y is a three-membered oxirane ring, A is oxygen, $R^a$ and $R^b$ are the same or different and selected from hydrogen and methyl, $R^c$ is oxygen, X and $R^d$ are hydrogen, n is equal to 1, q is equal to 2, m equals 1 or 2, and p is $\leq 10$. In another embodiment the invention comprises the dryable mixture wherein the amino-functional polymer is a cationically stabilizable emulsion polymer with a calculated glass transition temperature <35° C. that comprises on a dry basis:

i) 3 to 70 wt. % of at least one water-soluble polymeric compound having a number-average molecular weight >5000 which comprises a moiety selected from the group consisting of primary amines and secondary amines; and ii) 30 to 97 wt. % of a blend of vinylic, non-acidic monomers which are uncharged or positively charged in an aqueous solution having a pH between 1 and 8, which vinylic, non-acidic monomers include a) a nitrogen-containing monomer, b) a monomer that is either epoxy-functional or carbonyl-functional, and c) an acrylic or methacrylic ester.

In another embodiment, the dryable mixture has a blend of vinylic, non-acidic monomers wherein a) is selected from the group consisting of acrylonitrile and methacrylonitrile, b) is selected from the group consisting of glycidyl methacrylate, glycidyl acrylate, acetoacetoxyethyl methacrylate, acetoacetoxyethyl acrylate, acetoacetoxy(methyl)ethyl acrylate, acetoacetoxypropyl acrylate, acetoacetamidoethyl acrylate, acetoacetamidoethyl methacrylate, and acetoacetoxybutyl acrylate, and c) is selected from the group consisting of acrylate esters and methacrylate esters, said esters being made from alcohols of 1 to 8 carbon atoms. For example, the blend of vinylic, non-acidic monomers comprises 5 to 25% a), 5 to 20% b), and 55 to 90% c), such that the calculated glass transition temperature of said dried polymer is <25° C. before cross-linking.

In another aspect, the present invention relates to a cationically stabilizable amino-functional polymer having a number-average molecular weight of >3000, which exists in the presence of water as a solution or stable emulsion only when the pH is $\leq 8$, and which upon drying contains ethenically unsaturated moieties selected from the group consisting of acrylic, methacrylic, and enamine, wherein the amino-functional polymer is a condensation product of a reaction between an amino-functional polymer comprising reactive amine hydrogens with an element selected from the group consisting of halo-functional monomer, halo-functional oligomer, carbonyl-functional monomer, carbonyl-functional oligomer, epoxy-functional monomer, epoxy-functional oligomer, poly-functional acrylic monomer, poly-functional acrylic oligomer, poly-functional methacrylic monomer, and poly-functional methacrylic oligomer, said element containing or forming upon drying an ethenically unsaturated moiety selected from the group consisting of acrylic, methacrylic, and enamine, said element being further selected from the group consisting of 2-hydroxy-3-chloropropylacrylate, glycidyl methacrylate (GMA), glycidyl acrylate, acetoacetoxyethyl methacrylate (AAEM), acetoacetoxyethyl acrylate, acetoacetoxy(methyl)ethyl acrylate, acetoacetoxypropyl acrylate, acetoacetamidoethyl acrylate, acetoacetamidoethyl methacrylate, and acetoacetoxybutyl acrylate.

In still another aspect, the present invention relates to a coating composition for plastic film which composition contains a) 70 to 99 wt. % of an amino-functional polymer as described above; and b) 1 to 30 wt. % of an unsaturation number enhancer element selected from the group consisting of

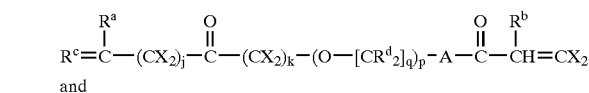

and

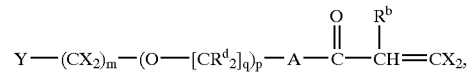

where Y is selected from the group consisting of halogen and three-membered oxirane ring, $R^a$ and $R^b$ are the same or different and selected from the group consisting of H and $C_1$ to $C_6$ alkyl, $R^c$ is selected from the group consisting of O and $CX_2$ each X can be the same or different and is selected from the group consisting of H, hydroxyl, and halogen, $R^d$ is selected from the group consisting of H, hydroxyl, halogen, and any organic radical containing at least one carbon atom, wherein each $R^d$ can be the same or different, A is selected from the group consisting of O and $NR^d$, $CR^d$ and $CR^d_2$ can each be a separate moiety or a portion of a cyclic structure, j, k, and m are integers ranging from 0 to 6, inclusive, q is an integer ranging from 1 to 6, inclusive, and p is an integer ranging from 0 to 30, inclusive. In a preferred embodiment of this aspect of the present invention, the amino-functional polymer is a condensation product of a reaction between an amino-functional polymer comprising reactive amine hydrogens with an element selected from the group consisting of halo-functional monomer, halo-functional oligomer, carbonyl-functional monomer, carbonyl-functional oligomer, epoxy-functional monomer, epoxy-functional oligomer, poly-functional acrylic monomer, poly-functional acrylic oligomer, poly-functional methacrylic monomer, and poly-functional methacrylic oligomer, said element containing or forming upon drying an ethenically unsaturated moiety selected from the group consisting of acrylic, methacrylic, and enamine. In another preferred embodiment of this aspect of the present invention, the coating composition further comprises at least one element selected from the group consisting of coating process-facilitating adjuvant, nonionic wax dispersion, cationic wax dispersion, nonionic slip additive, cationic slip additive, cationic colloidal silica, mineral filler, plastic pigment, cross-linking compound, curing catalyst, anti-static additive, and security taggant.

In yet another aspect, the present invention relates to a coating composition for plastic film which comprises a) 1 to 50 wt. % of the amino-functional polymer in which at least some ethenic unsaturation is covalently bonded to the polymer before drying as described above, and b) 50 to 99 wt. % of at least one additional polymer selected from the group consisting of nonionic polymer and cationic polymer. In one embodiment of this aspect of the present invention, the amino-functional polymer is a condensation product of a reaction between an amino-functional polymer comprising reactive amine hydrogens with an element selected from the group consisting of halo-functional monomer, halo-functional oligomer, carbonyl-functional monomer, carbonyl-functional oligomer, epoxy-functional monomer, epoxy-functional oligomer, poly-functional acrylic monomer, poly-functional acrylic oligomer, poly-functional methacrylic monomer, and poly-functional methacrylic oligomer, said element containing or forming upon drying an ethenically unsaturated moiety selected from the group consisting of acrylic, methacrylic, and enamine. In still yet another embodiment of this aspect of the present invention, the coating composition further comprises at least one element selected from the group consisting of coating process-facilitating adjuvant, nonionic wax dispersion, cationic wax dispersion, nonionic slip additive, cationic slip additive, cationic colloidal silica, mineral filler, plastic pigment, cross-linking compound, curing catalyst, antistatic additive, and security taggant.

In still another aspect, the present invention relates to a plastic film that comprises A) a plastic substrate layer and B) a coating comprising embodiments of the coating composition as described above. In an embodiment of this aspect of the present invention, the plastic film further comprises an ink print image on a surface of said coating opposite from said plastic substrate layer. In another embodiment of this aspect of the invention, the coating can be placed on another coating, e.g., poly(ethyleneimine) or a layer of metal or metal oxide, such as aluminum or aluminum oxide.

In still yet another aspect, the present invention relates to a curable mixture comprising i) polymeric amine having a number-average molecular weight of >3000 and covalently bonded side chains of at least one of a) ethenically unsaturated moieties selected from the group consisting of acrylic, methacrylic, and enamine, and b) precursors of ethenically unsaturated moieties selected from the group consisting of 2-hydroxy-3-chloropropylacrylate, glycidyl methacrylate (GMA), glycidyl acrylate, acetoacetoxyethyl methacrylate (AAEM), acetoacetoxyethyl acrylate, acetoacetoxy (methyl)ethyl acrylate, acetoacetoxypropyl acrylate, acetoacetamidoethyl acrylate, acetoacetamidoethyl methacrylate, and acetoacetoxybutyl acrylate; ii) epoxy cross-linking catalyst; and iii) cross-linking agent.

Another aspect of the present invention relates to the above-mentioned curable mixture, wherein said polymeric amine is a condensation product made by reacting an amino-functional polymer comprising reactive amine hydrogens with an element selected from the group consisting of halo-functional monomer, halo-functional oligomer, carbonyl-functional monomer, carbonyl-functional oligomer, acrylic-functional monomer, acrylic-functional oligomer, methacrylic-functional monomer, methacrylic-functional oligomer, epoxy-functional monomer, and epoxy-functional oligomer, said element containing an ethenically unsaturated moiety selected from the group consisting of acrylic and methacrylic. In one embodiment of this curable mixture, the amino-functional polymer is soluble in hydrophilic solvent at pH values $\leq 8$ and is insoluble at pH values >8. In another embodiment of this curable mixture, the amino-functional polymer forms a water-based emulsion at pH values $\leq 8$ and is unstable in water at pH values >8.

For present purposes, the term "cationically stabilizable amino-functional polymer" relates to amino-functional polymer that is capable of existing in the presence of water as a solution or a stable emulsion when the pH is $\leq 8$. This term is inclusive of cationically stabilizable amino-functional polymer, i.e., said polymer in its stabilized form. Loss of stability of the emulsifiable polymer can manifest itself in several ways: loss of performance (e.g., due to hydrolysis of a functional monomer) as well as coagulation or separation such that it cannot be redispersed under low-shear conditions (i.e., a shear rate of <38000 $s^{-1}$). In the present invention, a "stable emulsion" (absent fillers and other additives) is one that is dispersible under low-shear conditions or that has a functional shelf-life of at least two weeks without observable separation or coagulation, or, if observable separation or coagulation does occur, redispersion can be effected at low-shear conditions as described above. In other words, an unstable emulsion is one that cannot be redispersed or that can only be dispersed under high-shear conditions with a high-shear mixer at a shear rate of at least 38,000 $sec^{-1}$ or in a sonicator at a power density of at least 4 watts per milliliter $sec^{-1}$. Examples of such processing equipment include Branson sonifiers and high-shear mixers, e.g., Model L4RT ⅓ hp variable speed lab mixture manufactured by Silverson Machines, Inc., East Longmeadow, Mass., USA.

The cationically stabilizable, amino-functional polymer of the present invention has positive charges along its backbone, which are generally associated with negatively charged counterions like $Cl^-$, $Br^-$, $NO_3^-$, $SO_4^{-2}$, $RCO_2^-$ derived from inorganic or organic acids of relatively low molecular weight. If the localized pH around the cationic polymer exceeds 8, "kick out" or coagulation of the polymer will occur.

Self-curing embodiments of the amino-functional polymer of the present invention include those wherein at least one of the monomers is epoxy-functional; and the water-soluble polymeric compound has a number-average molecular weight >5000, preferably >7500, and comprises a moiety selected from the group consisting of primary amines, secondary amines, and tertiary amines. The epoxy-functional monomer can be selected from the group consisting of glycidyl acrylate and glycidyl methacrylate (GMA). In a preferred embodiment, the self-curing, cationically stabilizable emulsion polymer comprises at least one of said monomers that contains nitrogen, e.g., a nitrogen-containing monomer selected from the group consisting of acrylonitrile and methacrylonitrile. Preferably, the water-soluble polymeric compound is present in an amount sufficient to stabilize an emulsion of the polymer and react with the epoxy-functional monomer when the emulsion is dried. The ratio of epoxy equivalents to reactive amine hydrogen equivalents in self-curing polymer can vary widely. However, the preferred ratio is in the range between 1:1 and 3:1, with a ratio between 1.5:1 and 2.5:1 being more preferred.

For present purposes, "amino-functional polymer" relates to a polymer which comprises sufficient amine groups to stabilize an emulsion of the polymer with a hydrophilic solvent when protonated.

For present purposes "drying" relates to exposing a solution or emulsion to temperatures and times sufficient, e.g., as in a drying oven, to remove hydrophilic solvent to provide a coalesced solid. Thus a "dryable mixture" relates to a mixture that can be dried to an extent sufficient to provide a coalesced solid mixture.

For present purposes "number-average molecular weight" is determinable by gel permeation chromatography relative to polystyrene standards. To measure such, emulsions can be dissolved in THF (tetrahydrofuran), then filtered through a 0.5-micron disposable filter and run in the aforementioned solvent at a flow rate of 1.2 mL/min using a Jordi Gel DVB mixed bed column, 50 cm×10 mm (ID), on a Water Model 410. The column oven temperature was maintained at 35° C. The injection size was 150 microliters of a 0.15% (w/v) solution. The samples were monitored at a sensitivity of 8× and a scale factor of 20. Data acquisition and handling were with Sigma Ultratek software.

For present purposes, the term "unsaturation number enhancer element" relates to an additive or reactant whose addition or presence increases the extent of ethenic unsaturation in a dried polymeric film, as compared to a dried polymeric film differing only by the absence of said additive or reactant.

Plastic Substrate

The plastic substrate to be coated can be any thermoplastic material. Preferably, the plastic substrate is produced from a thermoplastic material, such as polyolefins, polyamides, polyesters, and polyethylene terephthalate. Examples of polyolefins to be used include alpha-olefins produced by Ziegler-Natta or metallocene catalysts, such as polyethylene, polypropylene, and copolymers and terpolymers thereof.

Preferably, the plastic substrate layer is a film, since thermoplastic films coated in accordance with preferred embodiments of the invention are particularly suitable for use as printable labels due to their excellent wet-scratch resistance, ink gloss and print image. The films can be clear or cavitated structures having one or several layers. Examples of film substrates particularly suitable for use are found in U.S. Pat. Nos. 5,382,473, 5,380,587 and 5,194,324, which are herein incorporated by reference. One preferred cavitated structure is a biaxially oriented cavitated polypropylene/polybutylene terephthalate film, disclosed in U.S. Pat. No. 4,632,869, which is herein incorporated by reference. One preferred clear structure is a biaxally oriented coextruded polyolefin film having a skin layer comprising a random copolymer of ethylene and propylene containing from about 0.5% to 6% ethylene disclosed in U.S. Pat. No. 4,439,493 by Hein et al. incorporated herein by reference.

Total thickness of the plastic film of the present invention can range from 7.5 to 250 microns. Clear label films are generally 25 to 75 microns, with 35 to 55 microns being preferred. Cavitated (or opaque) film substrates for labels can have a thickness from 50 to 250 microns, with 60 to 100 microns being preferred. Films used for flexible packaging (clear or opaque) tend to be thinner than labels: 7.5 to 50 microns with 12 to 40 microns being preferred.

Depending upon the intended use, the plastic film can be coated on one or two sides with the coating applied by any means known in the art as a continuous film or as a pattern. In coated areas, the application rate of the coating can be between 0.05 and 5 grams/msi. Economics generally favor thinner coating layers; however, one might choose to use thicker layers of coating to impart stiffness, moisture or gas barrier, seal strength, or optical effects (e.g., color, opacity, or a matte finish) to the plastic film.

Coating Composition

The various cationically stabilizable amino-functional polymers described above are especially suitable for use in a coating composition for plastic film. Such coating composition preferably comprises at least one additive that provides an improved coating. Such an additive can be selected from the group consisting of: coating process-facilitating adjuvant, nonionic wax dispersion, cationic wax dispersion, nonionic slip additive, cationic slip additive, cationic colloidal silica, mineral filler, plastic pigment, adhesion promoter, cross-linking compound, curing catalyst, anti-static additive, and security taggant. Such additives, some of which are further discussed below, are known to those skilled in the art.

Coating process-facilitating adjuvants include defoamers, wetting agents, lubricants, and the like. For example, the coating composition when applied to the substrate layer may not "wet out" uniformly, especially when such materials are applied in very thin layers. As a result, the dry but as yet uncured liquid mixture may retract into droplets or "islands". Also, high-speed application of coatings can generate foam. Volatile additives are generally preferred over non-volatile defoamers and surfactant-like wetting aids. Ethylene glycol monohexyl ether (commercially available as Hexyl Cellosolve™ from Union Carbide) facilitates wetting of the coating on the plastic substrate and helps to control foam. Other alcohols and glycol ethers like Dowanol™ PM made by Dow Chemical Company can serve a similar function. Typically the wet coating formulation can comprise from 0.2% up to about 10% by weight of such volatile processing additives.

Nonionic or cationic wax emulsions can improve block resistance or lower the coefficient of friction. Michemlube 156, produced by Michelman, Inc., is one of many suitable emulsions that are compatible with the cationic emulsion polymers disclosed in this invention. Such materials are generally unnecessary in cross-linked systems, but those skilled in the art know that such materials are important for balancing printability and sealability properties with blocking resistance in coatings that contain little or no cross-linking. Depending upon the application, up to 15% of the dried film can comprise wax.

Slip additives besides wax include synthetic particulates like Nippon Shokubai's Epostar™ poly(methyl methacrylate) spheres that are 1 to 6 microns in diameter dispersed in water or alcohol containing a small amount of nonionic or cationic surfactant to aid dispersion. Equally useful are similarly dispersed non-meltable poly (monoalkylsiloxanes) having a mean particle size of about 0.5 to about 20 microns and a three-dimensional structure of siloxane linkages. Such materials are commercially available from Toshiba Silicone Co., Ltd and they are marketed under the trade name Tospearl™.

Dupont Specialty Chemicals manufactures two grades of colloidal silica: Ludox® CL (average particle size 0.012 micron) and Ludox® CL-P (average particle size 0.022 micron). These materials can lower the coefficient of friction, especially when the flexible packing film or labels are required to move smoothly over heated surfaces. Moreover, these small particulates can help to improve the adhesion of many types of ink. Some applications might require that the dried film contain up to 60% colloidal silica. Other applications require none at all.

Examples of mineral fillers and pigments particularly suitable for use in cationic emulsions are found in U.S. Pat. No. 6,025,059 to McGee et al. and are incorporated herein by reference. Such additives could be expanded to include dyes and pigments to impart color to the coated film.

Other useful adhesion promoters can be incorporated into the coatings to improve anchorage of the coating to certain substrates or to improve adhesion of a topcoat or ink to a substrate that has been coated with the formulated cationic polymer emulsion. Examples of adhesion promoters include, but are not limited to, chelated alkoxy titanates marketed under the trade name "Vertec" are available from Synetix (a division of Imperial Chemical Industries PLC), Silquest® Silanes from Crompton Corporation, or derivatives of phosphinic acid, phosphonic acid, or phosphoric acid as described in U.S. Pat. No. 4,223,115 to Zaruda et al., incorporated herein by reference.

The amino-functional polymer of the present invention can be cross-linked with a cross-linking agent added after the polymer synthesis to improve solvent resistance of the coating or to attenuate properties such as hot tack, even if the polymer has functional groups to self-cross-link. For present purposes, IPA resistance can measure solvent resistance. Measurement of IPA resistance of the coated plastic film of the present invention can be carried out by rubbing a 70%

IPA soaked swab about 4 by 4.5 centimeters available from Becton-Dickinson in a circular motion 20 times on a coated surface with medium pressure using the index finger. Damage or whitening of the coating is then visually assessed after the IPA dries.

The cross-linking agent can be selected from the group consisting of polyfunctional aziridine, epoxy silane, polyfunctional epoxy, polyfunctional isocyanate, urea formaldehyde, polyfunctional aldehyde, polyfunctional ketone, and melamine formaldehyde. Preferably, the cross-linking agent is selected from the group consisting of epoxy silane, polyfunctional epoxy, polyfunctional aldehyde, polyfunctional ketone, and melamine formaldehyde. Cross-linkers of the following general structure are most preferred:

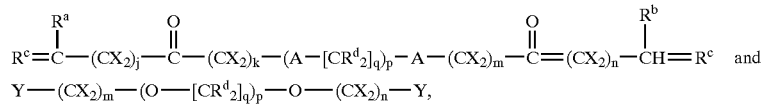

where Y is selected from the group consisting of halogen and three-membered oxirane ring, $R^a$ and $R^b$ are the same or different and selected from the group consisting of H and $C_1$ to $C_6$ alkyl, $R^c$ is selected from the group consisting of O and $CX_2$, each X can be the same or different and is selected from the group consisting of H, hydroxyl, and halogen, $R^d$ is selected from the group consisting of H, hydroxyl, halogen, and any organic radical containing at least one carbon atom, wherein each $R^d$ can be the same or different within the same molecule, A is selected from the group consisting of O and $NR^d$, $CR^d$ and $CR^d_2$ can each be a separate moiety or a portion of a cyclic structure, j, k, m and n are integers ranging from 0 to 6, q is an integer ranging from 1 to 6, inclusive, and p is an integer ranging from 0 to 30, inclusive.

In some circumstances, the cross-linking agent is added with a cross-linking catalyst. Such catalysts are known to those skilled in the art and many are listed by Steiner et al. in U.S. Pat. No. 4,214,039, incorporated herein by reference. Preferred amine catalysts include Ancamine® K54 (Tris-2, 4,6-[dimethylaminomethyl]phenol) and Imicure® EMI-24 (2-ethyl-4-methyl-1H-imadazole) manufactured by Air Products and Chemicals, Inc. These amine catalysts are also preferred for the self-curing cationic polymers of this invention. To avoid coagulation of the cationic emulsion, one should dilute these amine catalysts with water to about 1% before adding them to the emulsion. Alternatively, the amine catalysts can be diluted to about 10% solutions that have had the pH lowered to <8 with a mineral acid like HCl or an organic compound like acetic acid. Acid catalysts are preferred for formaldehyde resins, preferably p-toluene sulfonic acid.

Some applications require the coated film to have anti-static properties. Many anti-static additives contain monomeric or polymeric quaternary ammonium salts. These additives are easily compatible with the cationic polymer emulsion of this invention. One such additive is diallyldimethyl ammonium chloride (261 RV manufactured by Calgon Corporation of Naperville, Ill.). Alternatively one can use combinations of nonionic surfactants and low-molecular-weight salts like lithium halides, choline chloride, lithium tetrafluoroborate, and other salts known in the art to impart anti-static properties to the coating. Amino-functional silicones such as Ultrasil A-300 (manufactured by Noveon of Brecksville, Ohio) can also contribute to static dissipation.

Inclusion of security taggants in plastic films is useful in identifying counterfeited products or identifying the source of supply in product-liability cases. Any material that is insoluble, stable to conditions of use, and uniquely identifiable could be dispersed into the cationic coatings and applied to a plastic film. Micot Corporation manufactures small multi-colored chips that they market under the trade name Secutag®. These insoluble, heat-resistant particles have particle sizes ranging from 5 to 125 microns. These inert materials are easily dispersed into the cationic emulsions of this invention. These markers are useful, because every customer has a unique color code built into at least four up to ten microscopic layers. Inclusion of a tiny amount of these materials into the coating can uniquely identify the source of the coating or the coated film.

Coated Plastic Film

The above-described coating composition can be applied to a plastic film. Such plastic film can be used in various applications including packaging and labeling. The plastic film comprises i) a plastic substrate and ii) any of the coating compositions of the invention described above. In one embodiment, the plastic film comprises an ink print image on the side of said coating opposite from said plastic substrate. In another embodiment, the plastic film comprises a coating layer that imparts properties to the film which properties are selected from grease barrier, moisture barrier, gas barrier, light barrier, printability, receipt of an image via a process selected from the group consisting of mechanical (e.g., embossing, engraving or etching), electronic, magnetic, thermal, chemical and photographic processes, generation of an image via a process selected from the group consisting of mechanical (e.g., embossing, engraving or etching), electronic, magnetic, thermal, chemical and photographic processes, carrying of anti-microbial agents, carrying of colorants, carrying of scents, water absorption, organic solvent absorption, release from pressure-sensitive adhesives, mar resistance, anti-static, conductivity, machinability, sealability, and adhesion.

The coating layer can be selected from vapor-deposited metals or metal oxides and any polymeric coatings known in the art, and can be in the form selected from at least one of the group consisting of aqueous solvent dispersions, aqueous solvent solutions, organic solvent dispersions and organic solvent solutions. Such coatings can comprise at least one member of the group consisting of acrylic, styrene acrylic, styrene butadiene, acrylonitrile-butadiene-styrene, poly(vinylidene chloride), poly(vinyl chloride), poly(vinyl alcohol), ethylene vinyl alcohol, ethylene-acrylic acid copolymer, polysilicates, silicones, polyurethane, and gelatin. Preferred metals and metal oxides include aluminum, silver, gold, copper and their oxides, with aluminum and aluminum oxides being preferred in one embodiment.

Primer Layer

In another embodiment of the present invention, a primer or functional layer can be applied to the coating side of the plastic substrate prior to coating. Examples of the primer for thermoplastic materials include poly(ethyleneimine), which can be coextruded with or coated on the plastic substrate, and the epoxy coating at a low coating weight following the teaching of U.S. Pat. No. 4,214,039, to Steiner et al. Corona, plasma or flame treating can also be used with or instead of the primer. Functional layers can provide a barrier to grease, light, gas, and water vapor transmission, for example, or other beneficial properties of coatings listed earlier. Materials to be used as the functional layer include, but are not limited to, metal, metal oxide, ethylene vinyl alcohol (EVOH), PVOH, and PVdC. The metal and metal oxides may be the same as those described with respect to the coating layers above.

Coating on Side Opposite of the Printable Layer

In order to provide printable labels, the non-print surface of the coated plastic substrate (i.e., the surface of the substrate opposite the coating) can be coated with various adhesives and have a releasable liner adhered thereon, or with anti-static coatings to improve application performance of coated substrates. Coating may optionally be applied on the side opposite side of the substrate film from the printable layer to improve the adhesion of pressure sensitive adhesives or to improve blocking, etc.

Printing

The ink print image can be applied to the coated substrate using any known printing process. Examples include, but are not limited to, gravure, flexographic, lithographic, UV-screen, UV-letterpress, inkjet, and intaglio printing processes. Similarly, the choice of inks to be used is variable.

The following non-limiting examples illustrate the preparation of several cationic emulsions and the advantageous use of the above-described coating on plastic films.

EXAMPLE 1

This example shows a comparative amino-functional polymer having ethenic unsaturation does not necessarily improve adhesion of inks even for films cured at ambient temperature. Glycidyl methacrylate (GMA) was reacted with poly(ethylene imine). In one case (identified as the "+1" AP-Type in FIG. 1) enough GMA was put into the reaction mixture to consume 90% of the reactive amine hydrogens in Epomin P-1050 (theoretically yielding up to about 4230 micro-equivalents [$\mu$eq] ethenic unsaturation per dry gram). In the other case (identified as the "−1" AP-Type in FIG. 1), the amount of GMA would only consume up to 50% of the reactive amine hydrogens (yielding up to about 2960 $\mu$eq ethenic unsaturation per dry gram). In a designed experiment, these additives were mixed with a self-curing cationic emulsion (see Polymerization Example C below) and coated on the print surface of 196LL B2 manufactured by the Films Business of ExxonMobil. The coating formulations were diluted to 5% solids with water containing 0.5% Hexyl Cellosolve™ from Union Carbide and applied to corona-treated film with a 130-Quad direct gravure cylinder at 35 feet per minute. The coating was dried at 120° C. The main effects plot shows the responses to the design variables after the samples were ambient-aged for one week and then hand printed with Norcote black UV-curable screen ink. Three passes under the UV light were used to cure the ink: Zero or 2 phr (parts per hundred resin) Imicure EMI-24 was included in the coating formulations (corresponding to the "−1" and "+1" Cat-Level, respectively, in FIG. 1). This material helps to catalyze the curing reaction in the epoxy-functional cationic polymer. Responses to this variable were not statistically significant. Responses to adhesion promoter level (AP-Level) were contrary to expectations. Samples without any GMA-modified-PEI (the "−3" condition for A-P Level in the above graph) had the best ink adhesion. Moreover, the trend shows that, on average, more GMA-modified-PEI actually reduced ink adhesion in the range from 0 to 850 $\mu$eq ethenic unsaturation per gram of dried coating. However, AP-Type did yield a statistically significant response (98% confidence): The additive that contained more GMA yielded better ink adhesion, which is a trend that follows an expectation that more ethenic unsaturation would improve adhesion.

Responses for ink adhesion after heat aging were not plotted. All the results were bad (<10% adhesion)—even controls that did not contain PEI derivatives. So, these results show that having ethenic unsaturation in a primer for UV-curable inks is not sufficient to enhance ink adhesion. In fact, such materials can actually degrade adhesion depending upon the nature of the polymeric backbone to which the ethenic unsaturation is attached.

EXAMPLE 2

Art taught by Republic of South Africa Patent Application 970523 (UCB) teaches polyallylic materials can be used as adhesion promoters. This example shows that self-curing cationic polymers modified to create a polyallylic material are inferior to self-curing cationic polymers modified to create a polymethacrylate derivative in promoting the adhesion of UV-curable ink.

A self-curing cationic emulsion was prepared according to the procedure described in Polymerization Example C, which had an epoxy to amine hydrogen ratio of 2.0±0.25 to 1. After the polymerization was complete, another equivalent of GMA was added directly to the emulsion so that the total ratio of epoxy equivalents to amine hydrogens was 3.0±0.25 to 1. Then the mixture was heated for 8 hours at 50±5° C. in the presence of 1000 ppm methyl ether of hydroquinone (MEHQ) to inhibit the homopolymerization of the additional GMA. Based on the increase in non-volatile material, ~86% of the monomeric GMA became bound to the polymer, despite the large excess of epoxy functionality in the system. Theoretically, this polymer would now be a polymeric polyfunctional methacrylate with an ethenic unsaturation content of about 300 $\mu$eq per dry gram if none of the ethenic content were lost to side reactions.

An emulsion polymer with the same composition was treated with the same number of equivalents of allyl glycidyl ether (AGE). Since AGE will not homopolymerize, no MEHQ was put into the emulsion and higher temperature was used to facilitate the condensation of the glycidyl ether with the amine stabilizer in the emulsion. After three hours at 70° C. only ~20–25% of the AGE was coupled to the polymer. Though the coupling was not as efficient, we still prepared a polymeric polyallylic material.

Both chemically modified emulsions and an unmodified emulsion as a control were formulated in the following way and applied to the print surface of 196LL B2 made by the ExxonMobil Films Business:

| | |
|---|---|
| Polymer Emulsion C | 100 phr (dry weight) |
| Imicure EMI-24 (Air Products) | 2 phr (dry weight) |

After coating and drying at about 120° C. as described in Example 1, samples were conditioned for one week at 53° C. and then inked with Norcote black UV screen ink. We cured one set of inked samples with two passes under the UV lamp and another set with three passes under the UV lamp. TABLE 1 below summarizes the results for ink adhesion after three pulls with Scotch® 600 tape from crosshatched samples tested within ten minutes of having the ink cured:

TABLE 1

| Polymer Emulsion | % Ink Adhesion (2 UV Passes) | % Ink Adhesion (3 UV Passes) |
|---|---|---|
| Unmodified Control | 5 | 80 |
| GMA-modified | 100 | 100 |
| AGE-modified | 5 | 10 |

Table 1 shows that the polyallylic polymer actually afforded worse ink adhesion than the unmodified control in heat-aged samples. Robust ink adhesion is important for heat-aged films, because coated films can become very hot in warehouses or in transit during the summer months.

The effect of the AGE is quite dramatic in view of the small amount that was actually coupled with the emulsion polymer (probably only 60–80 µeq ethenic unsaturation per dry gram). Though the boiling point of AGE is 154° C., most of the unbound AGE will evaporate when put down as a thin film in an oven with high airflow at 120° C. AGE (bound or unbound) does not inhibit ink adhesion, for ambient-aged versions of the same samples all had 100% ink adhesion. So, something must have occurred during the heat-aging process (such as an oxidative cross-linking reaction) that decreased the affinity of the ink to the substrate.

The effect of GMA was equally dramatic, but in a way that is useful. One can infer from the results in the above table, that the ink curing occurs more quickly (requires less UV radiation) when the print surface contains a self-curing cationic polymer modified with ethenically unsaturated methacrylate groups. At about 300 µeq ethenic unsaturation per dry gram, this sample is roughly in the middle of the range of ethenic unsaturation covered in Example 1, which showed poor results.

EXAMPLE 3

This example describes the preparation of an unsaturation number enhancer element (which acts here as an adhesion-promoting element), in which GMA was coupled with a polymer that is soluble in water only at pH values <8 having a number-average molecular weight >3000 which comprises a moiety selected from the group consisting of primary amines and secondary amines. In this example, NK7000 from Nippon Shokubai was used. For NK7000 $M_n$ is about 10,000 daltons and it has an amine-hydrogen equivalent weight of 400±50 grams. The following ingredients were mixed and stirred for sixteen hours at 45–50° C. or two hours at 70° C.:

| | |
|---|---|
| NK7000 (49% solids) | 326.4 g (0.4 eq amine hydrogen) |
| Glycidyl Methacrylate | 56.8 g (0.4 eq epoxy and methacrylate) |
| Deionized Water | 58.4 g |
| MEHQ | 1.1 g |

At the end of the reaction time, enough water was added to the mixture to cut the solids content to ~17%. Based on solids measurements, more than 80% of the GMA was bound to the NK7000. The next example compares these adhesion-promoting additives to Denacol Acrylate (DA-931), which is a linear diacrylate in which 2-hydroxy-3-chloropropyl acrylate was used to cap both ends of a propylene glycol polymer containing eleven repeat units via displacement of the halogen. The equivalent weight for one acrylate group is about 456, which is similar to the GMA-modified NK7000. Put another way, one gram of DA-931 contains about 2200 µeq of ethenic unsaturation and the GMA-modified NK7000 contains about 1800 µeq of ethenic unsaturation per dry gram.

EXAMPLE 4

Figure 2:
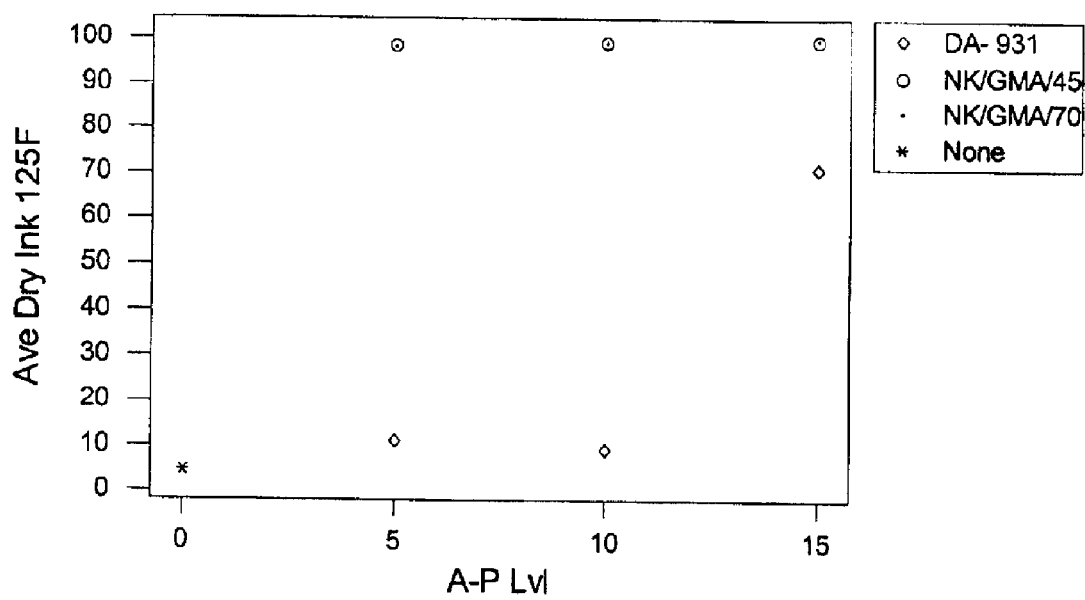
FIG. 2 depicts average dry ink adhesion for heat-aged coated films after curing the ink with only two passes under the UV lamp. The coating formulations contained self-curing cationic polymer, i) with no adhesion promoter (comparative), ii) with DA-931, a linear diacrylate in which 2-hydroxy-3-chloropropyl acrylate was used to cap both ends of a propylene glycol polymer containing eleven repeat units via displacement of the halogen, containing about 2200 µeq of ethenic unsaturation (comparative); and iii) an adhesion-promoting additive of the present invention, GMA-modified NK7000, in which GMA was coupled with a polymer that is soluble in water only at pH values <8 having a number-average molecular weight >3000 which comprises a moiety selected from the group consisting of primary amines and secondary amines. Acceptable average initial dry ink adhesion was obtained only for the formulations of the present invention.

Polymerization Example C, which was used as a control in Example 2, was formulated with 2 phr Imicure EMI-24 and coated on the print face of 196LL302 as a control in this example also. Other coating formulations additionally contained 5, 10, or 15 phr by dry weight of one of the adhesion promoters described in Example 3. After coating as described in Example 1, the samples were conditioned for seven days at 53° C. and then hand inked with black Norcote screen ink. Inks were cured with only two passes under the UV lamp. FIG. 2 summarizes the results of the X-hatch ink adhesion test.

Without adhesion promoter, the self-curing cationic polymer held on to only 5% of the ink after three pulls with Scotch® 600 tape. FIG. 2 also shows that when DA-931 was used as the adhesion promoter, it took 15 phr (yielding about 300 µeq per dry gram ethenic unsaturation) to see a significant improvement in ink adhesion. However, even at this level, the ink adhesion was still below the target of ≧95%. Moreover, if the amount of Denacol Acrylate were to be increased beyond 15 phr to get targeted ink adhesion values, IPA resistance would diminish. In contrast, whether the condensation reaction was done at 45° C. or 70° C., the GMA-modified NK7000 gave nearly perfect ink adhesion with as little as 5 phr added (which yielded about 90 µeq ethenic unsaturation per dry gram, assuming none of the double bonds were lost to competing side reactions).

Part of the explanation for the low enhancement of adhesion by Denacol Acrylate, followed by a marked increase in adhesion promotion comes from recognizing that, in a cationic system, reactive amine hydrogen can add via a Michael-type addition to acrylic-functional species (Hulse (1956) U.S. Pat. No. 2,759,913 and F. Moeller, Houbon-Weyl, Vol. 11/1 (1957), pp. 277–280 cited in Kranig et al., (2001) U.S. Pat. No. 6,177,144 B1). Since the reaction consumes reactive amine hydrogens, at a high enough loading, proportionately more double bonds will remain to boost ink adhesion.

Resistance to isopropyl alcohol (IPA) provides indirect evidence of this cross-linking and helps to distinguish among different adhesion promoters. TABLE 2 below compares the IPA resistance of samples already described that were aged at ambient conditions for seven days. After rubbing with an IPA-soaked swab using 20 circular rubs and light finger pressure, the samples were rated on a relative 0–5 scale, with 5 being best. Ink adhesion results are also displayed for the heat-aged samples cured with only two passes under the UV lamp:

TABLE 2

| Polymer Emulsion | Adhesion Promoter Type | Adhesion Promoter Level (phr) | IPA Resistance Rating (Ambient Aged 7 Days) | % Ink Adhesion (Heat Aged 7 Days) |
|---|---|---|---|---|
| Polymerization Example C | None | None | 3.5 | 3 |
| Polymerization | GMA-PEI | 10 | 4.5 | 3 |

TABLE 2-continued

| Polymer Emulsion | Adhesion Promoter Type | Adhesion Promoter Level (phr) | IPA Resistance Rating (Ambient Aged 7 Days) | % Ink Adhesion (Heat Aged 7 Days) |
|---|---|---|---|---|
| Example C | (+1 A–P Type from Example 1) | | | |
| Polymerization Example C | Denacol DA-931 | 10 | 4.5 | 9 |
| Polymerization Example C | GMA-NK7000 (Made at 70° per Example 3) | 10 | 3.5 | 99 |
| Polymerization Example C | GMA-NK7000 (Made at 45° C. per Example 3) | 10 | 3.0 | 99 |
| GMA-modified Emulsion C from Example 2 | GMA (covalently bonded to the emulsion polymer) | 4.4 | 5 | 100 |

The above table shows that Denacol Acrylate and the GMA-modified PEI significantly increased the IPA resistance of the cationic coating. A "4.5" rating is practically a perfect score Oust a few light scratches from rubbing, but no hint of whitening). A "3.5" rating indicates more scratches and some whitening of the coating, but with no coating removed by rubbing with light pressure. With more pressure, the sample with Denacol Acrylate just got heavier scratches, but the sample without adhesion promoter would have had coating removed by increased pressure. This is a good indication that, even at ambient temperature, a cross-linking reaction was occurring with the samples containing Denacol Acrylate or modified PEI. In contrast, the GMA-NK7000 adducts caused no appreciable change in the IPA resistance at ambient temperature, yet the heat-aged ink adhesion was superior (and the IPA resistance increased to "4.5" with heat aging).

The GMA-modified emulsion also afforded excellent UV ink adhesion to heat-aged samples, and the IPA resistance was improved also. One can account for the improvement in IPA resistance by recognizing that the prolonged heating during the coupling step promoted internal cross-linking. Since tertiary amines are one of the possible products of the cross-linking reaction and tertiary amines catalyze the self-cross-linking of epoxy functional compounds, the improvement in IPA resistance can be expected in ambient-aged samples because of the enhanced cross-linking rate. Surprisingly, the increased internal cross-linking does not proceed to the point to which it interferes with coalescence of the coating, for all the coated films in this example had haze values <2%.

EXAMPLE 5

Another novel way to introduce reactive unsaturation into a self-curing cationic emulsion is to include acetoacetoxyethyl methacrylate (AAEM) in the polymerization. In this Example some or all of the GMA was replaced with AAEM. This carbonyl-functional monomer will condense with polymer-bound amines to form an enamine according to the following reaction:

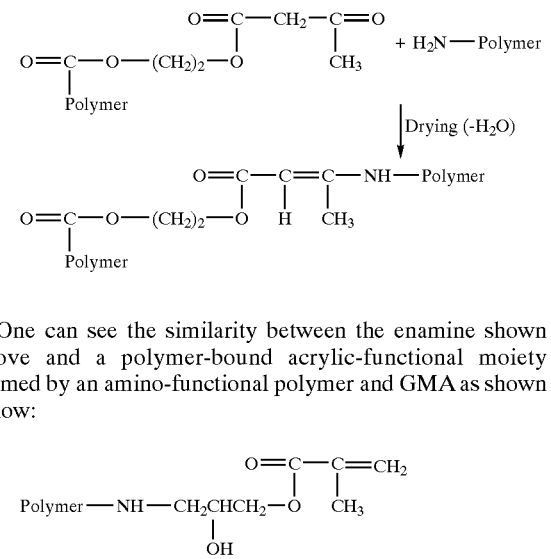

One can see the similarity between the enamine shown above and a polymer-bound acrylic-functional moiety formed by an amino-functional polymer and GMA as shown below:

$$\text{Polymer}-\text{NH}-\text{CH}_2\text{CHCH}_2-\overset{|}{\underset{\underset{\text{OH}}{|}}{\text{O}}}\overset{\text{O}=\text{C}-\text{C}=\text{CH}_2}{\underset{\text{CH}_3}{|}}$$

One polymer was prepared using the same process as the unmodified cationic polymer prepared in Example 2. However, the monomer mixture contained 8% GMA and 2% AAEM instead of 10% GMA. Still another example was prepared in which all 10 weight % GMA was replaced by the same weight % AAEM. If all the AAEM were converted to enamine, the ethenic unsaturation would be about 80 μeq per gram of dried coating for the polymer that contained 2% AAEM. The ratio of reactive amine hydrogens to acetoacetate groups is about 4:1 on a molar basis. The other dried polymer would contain about 410 μeq per dry gram. In the second polymer the ratio of reactive amine hydrogens to acetoacetate groups is about 0.8:1 on a molar basis.

Both polymer emulsions were coated as in Example 1, except that no imidazole cross-linking catalyst was used. After aging the coated film for seven days at 53° C., the samples were hand inked with black screen ink and cured with only two passes under the UV light. The sample containing 2% AAEM in the monomer mixture provided 97% ink adhesion. The sample with more AAEM yielded 100% ink adhesion.

IPA resistance after ambient aging for seven days was the same as the unmodified control (a "3.5" rating) for the sample containing 2% AAEM. The sample with more AAEM had a "4.0" rating, which shows that epoxy-functional monomers are not essential for self cross-linking cationic emulsions.

EXAMPLE 6

This example shows that AAEM does not need to be copolymerized with the other monomers to function as an adhesion promoter for UV-curable ink, especially in heat-aged samples. The unmodified polymer from Example 2 was blended with 5 phr by weight AAEM and coated as described in Example 2, but without any epoxy curing catalyst added. The physical blend was made and diluted to ~5% solids with water and 0.5% hexyl cellosolve and coated on corona-treated 196LLB2 as in Example 1. If all the monomeric AAEM formed enamines with the cationic polymer upon drying, the dried film would contain about 440 μeq per dry gram more ethenic unsaturation than the film coated with emulsion that did not contain AAEM. Unlike the GMA-modified polymer in Example 2, no heating of the mixture before drying was necessary to have AAEM joined to the polymer backbone in the dried film. Moreover, the following diagram shows that each mole of bound AAEM creates two moles of ethenic unsaturation in the dried film: one mole of methacrylate functionality and one mole of enamine:

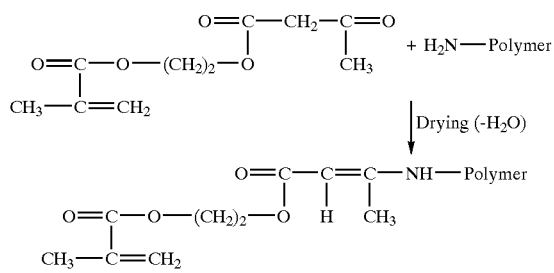

After conditioning for seven days at 125° F., the coated samples were inked with black UV-curable screen ink, cured with two passes under the UV light, and crosshatched. The tape test showed 100% of the ink stuck to the film containing AAEM. Without the additive, the same polymer only yielded 5 to 10% ink adhesion.

IPA resistance was "3.0" for the coating containing AAEM, which is differs little from the unmodified coating ("3.5"). Since the coating did not contain any epoxy curing catalyst, this result is not surprising. This shows that monomeric AAEM is an effective adhesion promoter, but it does not promote cross-linking that enhances IPA resistance. The implication from Example 5 is that copolymerized AAEM can improve both IPA resistance and UV ink adhesion under some conditions.

EXAMPLE 7

Prior art teaches that pendant acetoacetate groups in vinylic polymers are not hydrolytically stable unless enamines are created in the wet emulsion at pH values of 9 or more (U.S. Pat. No. 5,525,662 to Lavoie, et al.). They define a pendant acetoacetate group as one that is attached to the polymer backbone and available for further reaction. Their definition does not exclude the attachment of such group to the termini of a polymer chain. This example will show that self-curing cationic emulsion polymers as described herein, which contain about a 4:1 amine-hydrogen to acetoacetate molar ratio, can demonstrate fairly good hydrolytic stability at pH values <7.

Emulsions from Polymer Example A described below (which contains AAEM such that the ratio of reactive amine hydrogens is about 4:1 in the polymer) and Polymer Example C (which does not contain AAEM), were made into coatings containing 2 phr Imicure EMI-24, 10 phr Denacol EX-821, 5 phr monomeric AAEM, and applied to 196LLB2 as described in Example 1. Polymer Emulsion A was tested after three weeks and after five weeks ambient aging of the emulsion. Ambient-aged coated samples were tested for IPA resistance and wet and dry UV ink adhesion using Norcote black screen ink. TABLE 3 below summarizes the results:

TABLE 3

| Polymer Type | IPA Resistance Rating | Dry Ink Adhesion | Wet Ink Adhesion |
|---|---|---|---|
| Example C | 4 | 100 | 100 |
| Example A 3 weeks old | 5 | 100 | 100 |

TABLE 3-continued

| Polymer Type | IPA Resistance Rating | Dry Ink Adhesion | Wet Ink Adhesion |
|---|---|---|---|
| Example A 5 weeks old | 5 | 100 | 99.5 |

The above results show that without copolymerized AAEM, the IPA resistance is slightly inferior to the polymer that contains copolymerized AAEM. Had the copolymerized AAEM significantly hydrolyzed over the five-week period, we should have seen degradation of IPA resistance. Moreover, the decomposition products of AAEM hydrolysis are acetoacetic acid and hydroxyethyl methacrylate. Therefore, a decomposed AAEM would have created sites on the polymer backbone that are more hydrophilic. This would have contributed to lessened wet adhesion and could have also compromised IPA resistance. Example 10 will show how wet adhesion can be lost if the polymer contains too much water-sensitive material.

EXAMPLE 8

This example compares IPA resistance, initial ink adhesion for ambient-aged and heat-aged samples, retained ink adhesion after immersion in water, and nickel scratch resistance for different formulations of polymers A, B, and C. All coatings were applied to the print face of 196LL B2 manufactured by the Films Business of ExxonMobil that was corona treated in line just before the wet coating was applied to the film with a 130 Quad direct gravure cylinder. Each coating contained 100 dry parts (100 phr) of either Polymer A, B, or C. To attain the proper coating weight (~0.1 grams per 1000 in$^2$), the wet coating was diluted to 5% solids. Each coating formulation also contained 0.5% Hexyl Cellosolve™ from Union Carbide. All formulated coatings were stirred for at least two hours, but >24 hours before coating. This example shows importance of having the right amount cross-linking comonomer in the cationic emulsion polymer and the right amount of cross-linking from reagents added to the coating formulation.

Some formulations contained cross-linking reagents (XLR). Tetraethylene glycol diacrylate (TEGDA) was purchased from Aldrich. Tetraethylene glycol diglycidyl ether (Denacol EX-821) was obtained from Nagase. Trimethylolpropane proxylate triacrylate with one (TPTA-1) or two (TPTA-2) propylene oxide units per hydroxyl on the trimethylolpropane backbone was purchased from Aldrich. When used, the coating formulation contained 10 dry parts (10 phr) of the cross-linker.

All formulations contained 5 dry parts (5 phr) AAEM added to the wet coating formulation as an adhesion promoter. This AAEM is independent of any AAEM that might have been copolymerized in the polymer emulsion. Copolymerized AAEM primarily serves as cross-linking comonomer for the dried polymer emulsion.

Some formulations also contain an epoxy cross-linking catalyst (CAT) manufactured by Air Products: Imicure EMI-24. When used, 2 dry parts (2 phr) were used in the coating formulation. To make this material more easily incorporated into the coating mixture, it was diluted to 10% solids and the pH was adjusted to 7.5 with glacial acetic acid.

% INK=Percentage of ink that remains on a crosshatched area after three rapid pulls with Scotch®600 tape available from 3M of Minneapolis, Minn. The ink was scored by a BYK-Gardner Cross-Cut-Tester, which is an instrument comprising eleven blades arranged to cut a cross-hatched pattern down to the substrate layer after perpendicular cuts. Norcote UV black screen ink was applied by hand using a 20-micron screen in a room that was temperature-controlled at 19–20° C. Samples were cured by passing the inked sample twice under the UV curing lamp in an apparatus built by Fusion Systems® at 100 feet per minute. Samples were tested within ten minutes of curing the ink. Greater than 95% ink adhesion is desired.

% INKW=Percentage of ink that remains of a cross-hatched area after three pulls with Scotch®600 tape. Samples were immersed in tap water for about 16 hours at ambient temperature and patted dry just before testing. Greater than 95% ink adhesion is desired.

IPA=After rubbing with an IPA-soaked swab using 20 circular rubs and light finger pressure, the samples were rated on a relative 0–5 scale, with 5 being best. A rating $\geq 4$ is desired.

NSR=Nickel Scratch Resistance helps to predict the ability of inked labels to withstand the rigors of the pasteurization process: 0–5, 5 best rating after ten strokes on the print surface backed with glass using the flat edge of a nickel. Samples were immersed in 90–95° C. water for 15–20 minutes and scratched within 10 seconds of removing the sample from the hot water. A rating $\geq 4$ is desired.

Samples were either aged for a week at ambient temperature or a week at 52° C. TABLE 4 below summarizes the results:

TABLE 4

| Polymer | XLR | CAT | Aging | % INK | % INKW | IPA | NSR |
|---------|-----|-----|-------|-------|--------|-----|-----|
| C | None | Yes | Amb. | 100 | 30 | 3.0 | 0 |
|   |      |     | Heat | 99 | 99 | 5.0 | 5 |
| B | None | Yes | Amb. | 100 | 100 | 4.5 | 2 |
|   |      |     | Heat | 13 | 60 | 5.0 | 4 |
| C | TEGDA | Yes | Amb. | 100 | 100 | 4.5 | 0 |
|   |       |     | Heat | 99 | 100 | 5.0 | 5 |
| B | TEGDA | Yes | Amb. | 99 | 99 | 5.0 | 5 |
|   |       |     | Heat | 83 | 90 | 5.0 | 5 |
| B | TPTA-1 | Yes | Amb. | 100 | 99 | 3.5 | 3 |
|   |        |     | Heat | 100 | 98 | 3.5 | 4.5 |
| C | TPTA-2 | Yes | Amb. | 100 | 80 | 4.0 | 1.5 |
|   |        |     | Heat | 98.5 | 96 | 4.5 | 4.5 |
| C | EX-821 | Yes | Amb. | 100 | 100 | 5.0 | 2 |
|   |        |     | Heat | 98 | 98 | 5.0 | 5 |
| B | EX-821 | Yes | Amb. | 99 | 99 | 5.0 | 5 |
|   |        |     | Heat | 25 | 60 | 5.0 | 5 |
| A | EX-821 | No | Amb. | 100 | 100 | 5.0 | 5 |
|   |        |    | Heat | 100 | 90 | 5.0 | 5 |
| A | EX-821 | Yes | Amb. | 100 | 100 | 5.0 | 5 |
|   |        |     | Heat | 100 | 99 | 5.0 | 5 |
| Targets | — | — | — | $\geq 95$ | $\geq 95$ | $\geq 4$ | $\geq 4$ |

Bold cells indicate that the measured property was inferior to performance targets. Only the samples containing Polymer A, Denacol EX-821, and Imicure EMI-24 simultaneously met all the performance criteria for ambient- and heat-aged samples.

Coatings that are insufficiently cross-linked will have poor pasteurization resistance according to the predictions of the nickel scratch test. Accordingly, ambient-aged coatings that did not contain cross-linker (TEGDA or EX-821) in the coating formulation did poorly in that test. Moreover, ambient-aged samples containing Polymer C (which lacks copolymerized AAEM) also did poorly even when TPTA-2, TEGDA, or EX-821 were present. If one made heat-aging part of the process, several candidates would satisfy all the criteria, but heat aging is expensive and can create other problems for coated plastic film.

Too much cross-linking is bad for ink adhesion in heat-aged films, and it matters how one cross-links the polymer. For example, (data not shown) dialdehydes like glyoxal will efficiently cross-link the self-curing cationic emulsion polymer, but cause ink adhesion properties to deteriorate. Heat-aged ink adhesion (wet or dry) was bad for all formulations made from Polymer B, which contained 5% AAEM in the copolymer mixture, even when no cross-linker was added to the coating formulation. The exception being TPTA-1; however, this material interfered with the development of IPA resistance, so it is no surprise that the ink adhesion is good.

Polymer A, which contained 2% AAEM in the comonomer mixture, gave excellent results when formulated with Denacol EX-821. Surprisingly, the wet adhesion was not as good when the epoxy curing catalyst was omitted from the coating formulation. Given the other results, one would not expect a water-soluble curing catalyst to benefit wet ink adhesion in a heat-aged sample. The catalyst in the coating probably also facilitates curing of the UV screen ink.

EXAMPLE 9

This example shows that diglycidyl ethers of polyethylene oxide have more desirable cross-linking properties than diglycidyl ethers of polypropylene oxide. All coated films in this example use the same types of polymers and formulating additives that were employed in Coating Example 1, except that different types of diglycidyl ethers were used. Unlike Coating Example 1, all the coatings in this series contain 10 phr cross-linking reagent (XLR). Results are provided in TABLE 5 below. The following designations are used for XLR:

EO-1=Denacol EX810: The diglycidyl ether contains one mole ethylene oxide (EO).
EO-4=Denacol EX821: The diglycidyl ether contains four moles EO.
EO-9=Denacol EX830: The diglycidyl ether contains nine moles EO.
PO-1=Denacol EX911: The diglycidyl ether contains one moles propylene oxide (PO).
PO-3=Denacol EX920: The diglycidyl ether contains three mole PO.
PO-11=Denacol EX930: The diglycidyl ether contains eleven moles PO.

TABLE 5

| Polymer | XLR | CAT | Aging | % INK | % INKW | IPA | NSR |
|---------|-----|-----|-------|-------|--------|-----|-----|
| A | EO-1 | Yes | Amb. | 100 | 100 | 5 | 5 |
|   |      |     | Heat | 100 | 100 | 5 | 5 |
| A | EO-4 | Yes | Amb. | 100 | 100 | 5 | 5 |
|   |      |     | Heat | 99 | 99 | 5 | 5 |
| A | EO-9 | Yes | Amb. | 98 | 100 | 5 | 5 |
|   |      |     | Heat | 99 | 98 | 5 | 5 |
| A | PO-1 | Yes | Amb. | 100 | 100 | 5 | 4.5 |
|   |      |     | Heat | 100 | 100 | 5 | 5 |
| A | PO-3 | Yes | Amb. | 100 | 100 | 5 | 3.5 |
|   |      |     | Heat | 100 | 99 | 5 | 5 |
| A | PO-11 | No | Amb. | 100 | 100 | 4.0 | 3.5 |
|   |       |    | Heat | 96 | 94 | 5 | 5 |
| C | PO-11 | Yes | Amb. | 100 | 60 | 3.5 | 3.5 |
|   |       |     | Heat | 100 | 100 | 5 | 5 |
| Targets | — | — | — | $\geq 95$ | $\geq 95$ | $\geq 4$ | $\geq 4$ |

Bold cells indicate that the measured property was inferior to performance targets. All the coatings that contained ethylene-oxide based cross-linkers met all the performance targets. While some of the coatings containing propylene-oxide based cross-linkers were acceptable, one can see that the ethylene oxide derivatives would be generally preferred.

EXAMPLE 10

This example describes an L-18 Taguchi design that was used to optimize several components of the complicated formulation mixture that contains a self-curing cationic emulsion containing no copolymerized AAEM (CP-AAEM) as in Polymer Example C, 2% copolymerized AAEM (Polymer Example A) or 5% copolymerized AAEM (Polymer Example B as described below), 2.5, 5.0, or 7.5 phr monomeric AAEM as an adhesion promoter (AP-L), 1.5, 2.0, or 2.5 phr Imicure EMI-24 as an epoxy cross-linking catalyst (XL-Cat or 1–24), and Denacol EX810, EX-821, or EX830 as a diepoxy cross-linkers (XL-EO) put in the formulations at 5, 10, or 15 phr (XL-Lvl). The first nine formulations were applied and dried within one hour of mixing and the last nine formulations were aged about 18 hours before coating and drying (Age). The Denacol epoxies are all diglycidyl ethers of (ethylene glycol), oligomers. For Denacol EX-810, n~1. For Denacol EX-821, n~4. For Denacol EX-830, n~9.

Figure 4:
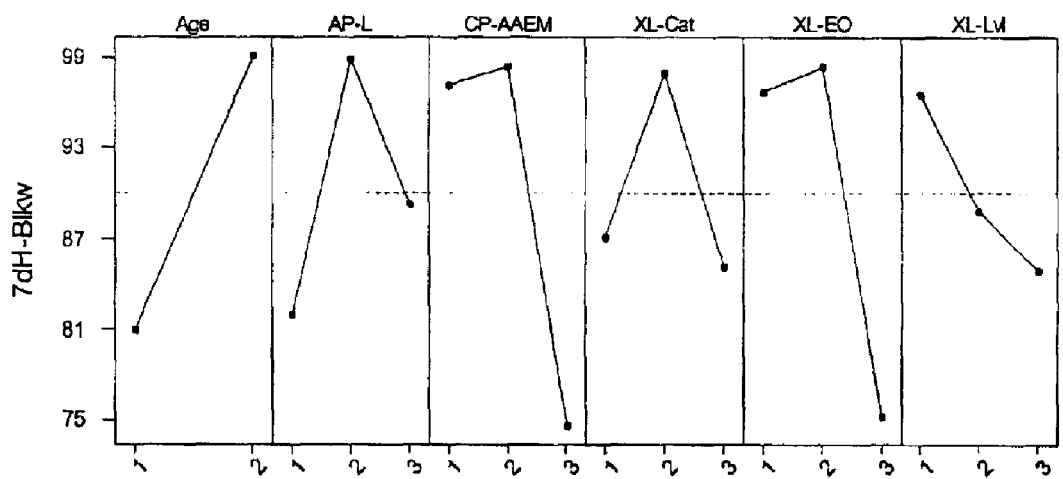
FIG. 4 depicts the main factors that affect wet ink adhesion in 7-day heat-aged (53° C.) samples in which six experimental factors were varied according to an L-18 Taguchi experimental design: age of the wet formulated coating, adhesion promoter levels, co-polymerized AAEM (CP-AAEM), epoxy cross-linking catalyst (XL-Cat), diepoxy cross-linker (XL-EO), and diepoxy cross-linker levels (XL-Lvl).

The eighteen coatings were mixed and coated on 196LLB2 according to the procedure in Example 1 and are further described below in TABLE 6.

shown in FIG. 4. FIG. 4 shows that wet ink adhesion is most robust when the amount of post-added AAEM is >2.5 phr and <7.5 phr. This range equals between 100 and 300 μeq per dry gram of methacrylate functionality plus between 100 and 300 μeq per dry gram of enamine functionality (assuming no unwanted side reactions). This material creates a polymeric amino compound with ethenic unsaturation upon drying with the self-curing cationic polymer. It can give robust ink adhesion with polymer types A, B, or C (2, 3, or 1, respectively for the CP-AAEM variable in FIG. 4), but it helps to have the right combination of other components. The statistical significance of XL-Cat is questionable, but other data (shown in TABLE 4 in Example 8) shows that product performance is not as robust if the epoxy cross-linking catalyst is left out of the coating formulation entirely. As the Age variable suggests, reaction of the epoxy-functional cross-linker with the amino-functional polymer in the wet state is beneficial to overall product performance.

The self-curing cationic emulsion polymer should preferably contain <5% AAEM in the mixture of copolymerized monomers. This roughly corresponds to having a ratio of reactive amine hydrogens to pendant acetoacetoxy groups in the cationic polymer that is >2:1. This suggests that if there

TABLE 6

| ROLL | X-L | X-L LDS % | X-L g | % 9.6 I-24 pH 7.5 g | % 37.7 Ltx C g | % 38.4 Ltx A g | % 38.3 Ltx B g | % 100 AEM g | H2O g | HEX. CEL. g | X-L PHR | I-24 PHR | Ltx C PHR | Ltx A PHR | Ltx B PHR | AAEM PHR |
|---|---|---|---|---|---|---|---|---|---|---|---|---|---|---|---|---|
| 1 | D-EX810 | 100 | 0.34 | 1.08 | 18.3 | 0.0 | 0.0 | 0.17 | 129.4 | 0.75 | 5 | 1.5 | 100 | 0 | 0 | 2.5 |
| 2 | D-EX821 | 100 | 0.66 | 1.36 | 0.0 | 17.1 | 0.0 | 0.16 | 130.0 | 0.75 | 10 | 2 | 0 | 100 | 0 | 2.5 |
| 3 | D-EX830 | 100 | 0.94 | 1.63 | 0.0 | 0.0 | 16.3 | 0.16 | 130.2 | 0.75 | 15 | 2.5 | 0 | 0 | 100 | 2.5 |
| 4 | D-EX821 | 100 | 0.64 | 1.01 | 17.1 | 0.0 | 0.0 | 0.32 | 130.2 | 0.75 | 10 | 1.5 | 100 | 0 | 0 | 5 |
| 5 | D-EX830 | 100 | 0.92 | 1.28 | 0.0 | 16.0 | 0.0 | 0.31 | 130.7 | 0.75 | 15 | 2 | 0 | 100 | 0 | 5 |
| 6 | D-EX810 | 100 | 0.33 | 1.74 | 0.0 | 0.0 | 17.4 | 0.33 | 129.4 | 0.75 | 5 | 2.5 | 0 | 0 | 100 | 5 |
| 7 | D-EX810 | 100 | 0.90 | 1.26 | 16.0 | 0.0 | 0.0 | 0.45 | 130.7 | 0.75 | 15 | 2 | 100 | 0 | 0 | 7.5 |
| 8 | D-EX821 | 100 | 0.33 | 1.70 | 0.0 | 17.0 | 0.0 | 0.49 | 129.7 | 0.75 | 5 | 2.5 | 0 | 100 | 0 | 7.5 |
| 9 | D-EX830 | 100 | 0.63 | 0.98 | 0.0 | 0.0 | 16.5 | 0.47 | 130.7 | 0.75 | 10 | 1.5 | 0 | 0 | 100 | 7.5 |
| 10 | D-EX830 | 100 | 0.65 | 1.70 | 17.3 | 0.0 | 0.0 | 0.16 | 129.4 | 0.75 | 10 | 2.5 | 100 | 0 | 0 | 2.5 |
| 11 | D-EX810 | 100 | 0.95 | 0.98 | 0.0 | 16.4 | 0.0 | 0.16 | 130.7 | 0.75 | 15 | 1.5 | 0 | 100 | 0 | 2.5 |
| 12 | D-EX821 | 100 | 0.34 | 1.43 | 0.0 | 0.0 | 17.9 | 0.17 | 129.4 | 0.75 | 5 | 2 | 0 | 0 | 100 | 2.5 |
| 13 | D-EX830 | 100 | 0.33 | 1.40 | 17.8 | 0.0 | 0.0 | 0.33 | 129.4 | 0.75 | 5 | 2 | 100 | 0 | 0 | 5 |
| 14 | D-EX810 | 100 | 0.64 | 1.66 | 0.0 | 16.6 | 0.0 | 0.32 | 130.0 | 0.75 | 10 | 2.5 | 0 | 100 | 0 | 5 |
| 15 | D-EX821 | 100 | 0.93 | 0.96 | 0.0 | 0.0 | 16.1 | 0.31 | 130.9 | 0.75 | 15 | 1.5 | 0 | 0 | 100 | 5 |
| 16 | D-EX821 | 100 | 0.90 | 1.56 | 15.9 | 0.0 | 0.0 | 0.45 | 130.4 | 0.75 | 15 | 2.5 | 100 | 0 | 0 | 7.5 |
| 17 | D-EX830 | 100 | 0.33 | 1.03 | 0.0 | 17.2 | 0.0 | 0.49 | 130.2 | 0.75 | 5 | 1.5 | 0 | 100 | 0 | 7.5 |
| 18 | D-EX810 | 100 | 0.63 | 1.31 | 0.0 | 0.0 | 16.4 | 0.47 | 130.4 | 0.75 | 10 | 2 | 0 | 0 | 100 | 7.5 |

Figure 3:
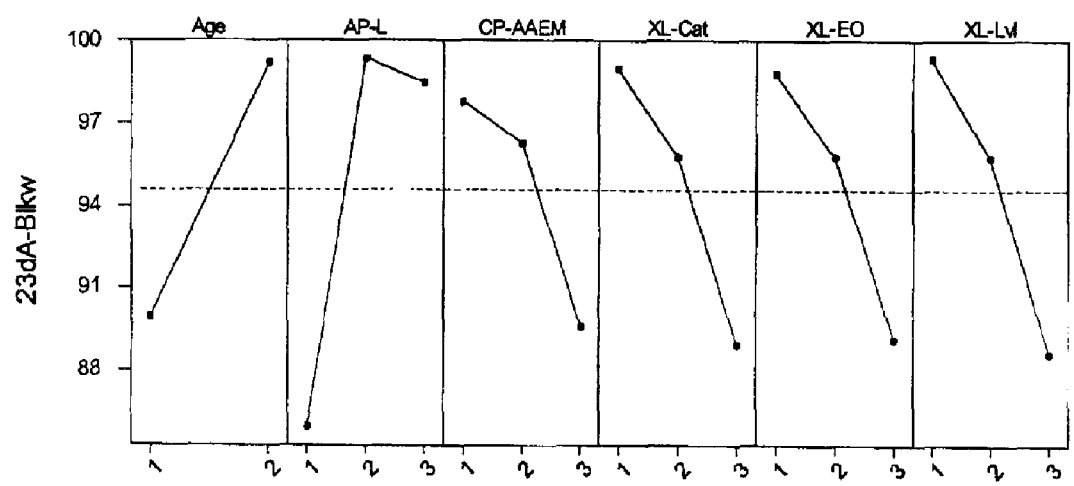
FIG. 3 depicts the main factors that affect wet ink adhesion in samples kept for 23 days at ambient temperature and humidity. Six experimental factors were varied according to L-18 Taguchi experimental design: age of the wet formulated coating, adhesion promoter levels, co-polymerized AAEM (CP-AAEM), epoxy cross-linking catalyst (XL-Cat), diepoxy cross-linker (XL-EO), and diepoxy cross-linker levels (XL-Lvl).

FIG. 3 depicts plots of six main effects and shows how the different components affected the performance properties. Black UV screen ink had excellent (≧98%) initial dry adhesion to all samples that were ambient aged for eight days. Wet adhesion was also excellent (≧97%) after immersing in water overnight. After 23 days of ambient aging (after the coatings have had a chance to cross-link more fully), initial dry adhesion remained excellent (≧99%) for all samples except numbers 2 and 3 above. However, there was a little more variability in retained ink adhesion after immersion in water overnight.

FIG. 3 shows that there is benefit in allowing the epoxy cross-linker to react with the other components of the formulation before coating, though it is not required if the formulation initially contains >2.5 phr monomeric AAEM. One also should avoid putting in too much water-sensitive material. If the cross-linker has too many EO units per mole, or if one puts in too much of the water-soluble cross-linker, then ink adhesion will degrade in a wet environment.

The responses for material heat-aged at 53° C. for a week reinforces these assertions about retained ink adhesion, as are not enough reactive amine hydrogens to form enamines with the copolymerized AAEM, then, when placed in a wet environment, the AAEM will be hydrolyzed to create a water-sensitive material. Since other components in the coating formulations described in this example also compete for reactive amine hydrogens, the preferred ratio is closer to 4:1 in this complex system. However, in a simpler formulation that had no other additives competing for the reactive amine hydrogens, the theoretical minimum ratio to prevent acetoacetoxy hydrolysis at <pH 7 would be approximately 1:1. Correspondingly, the formulated polymer from Example 5 that contained no GMA or other epoxy-functional materials, but only 10% copolymerized AAEM showed excellent ink adhesion (≧95%) for heat-aged films after immersion in water for 18 hours, though the ratio of reactive amine hydrogens to acetoacetoxy groups was only about 0.8:1. This shows that some amount of hydrolysis can be tolerated without adversely affecting the water-resistance properties.

After 23 days ambient aging or seven days at 53° C., all the samples in the L-18 experiment had excellent ratings (≧4.5) in the nickel scratch test.

Polymer Example A

This example shows the preferred polymerization process for making a self-curing cationically stabilizable emulsion polymer. This polymer contains a nitrogen-containing monomer, an epoxy-functional monomer, and an acetoacetoxy-functional monomer.

Using a semi-continuous batch process, a latex was prepared by continuously adding and metering 3500 grams of total monomer (consisting of 1680 grams methyl acrylate, 875 grams butyl acrylate, 525 grams acrylonitrile and 350 grams GMA, and 70 grams AAEM) over 2.25 hours to a stirred reactor containing 3500 grams deionized water, 200 grams NK7000, 10 grams 30% hydrogen peroxide, and 12 grams 10N hydrochloric acid. A feed containing 500 grams deionized water, 0.3 grams ferrous sulfate heptahydrate, and 10 grams ascorbic acid was metered in over about 3 hours. This feed was started after the oxygen had been removed from the reactor by a vacuum pump and padded with nitrogen, heated to about 55° C., and 150 grams of the monomer mixture were charged to the jacketed, glass-lined pressure vessel manufactured by Pfaudler. The agitation was set at 150 rpm. The temperature set point was 58° C. About 5–10 minutes after the activator feed was started, the monomer feed was started (at which time the initial exotherm had ended). Fifteen minutes after the activator feed was started, the stabilizer feed (consisting of 800 grams NK7000 and 1400 grams deionized water) was started and metered in over about 2.25 hours, ending at about the same time as the monomer feed. Deionized water was used to flush all the feed lines. After the activator feed was in, the temperature was increased 70° C. and for another three hours, and then the batch was cooled. The final heating step is optional and can be extended to at least six hours or eliminated altogether. The prolonged heating simulates the thermal history to which the emulsion would be exposed during a vacuum stripping operation to remove unreacted monomers.

The resultant polymer was 38.2% solids about 87.5% of which was the acrylic copolymer (consisting of 48% methyl acrylate, 25% butyl acrylate, 15% acrylonitrile, 10% GMA, and 2% AAEM) and 12.5% was NK7000. The finished batch had no observable coagulum and about 1 gram wet grit was removed by filtration through a 115-micron screen. It had a viscosity of 18 centipoise. The pH was about 4, and the intensity-weighted particle size was about 0.094 microns. The emulsion had a mild odor characteristic of methyl acrylate.

With this composition the ratio of active amine hydrogens to epoxy groups derived from GMA is about 1:2. The theoretical glass transition temperature is about 5° C. before the onset of cross-linking, Polymer Example B This polymer was made using the same process as Polymer Example A, but it contained more acetoacetoxy-functional monomer in the acrylic polymerization: 45% methyl acrylate, 25% butyl acrylate, 15% acrylonitrile, 10% GMA, and 5% AAEM. Solids, pH, viscosity, and particle size were comparable to the properties attained in Polymer Example A.

Polymer Example C

This polymer was made using the same process as Polymer Example A, but it contained no acetoacetoxy-functional monomer in the acrylic polymerization: 50% methyl acrylate, 25% butyl acrylate, 15% acrylonitrile, and 10% GMA. Solids, pH, viscosity, and particle size were comparable to the properties attained in Polymer Example A.

I claim:

1. A cationically stabilizable amino-functional polymer having a number-average molecular weight of >3000, which exists in the presence of water as a solution or stable emulsion only when the pH is ≦8, and which upon drying contains ethenically unsaturated moieties selected from the group consisting of acrylic, methacrylic, and enamine.

2. The amino-functional polymer of claim 1 that is a condensation product of a reaction between an amino-functional polymer comprising reactive amine hydrogens with an element selected from the group consisting of halo-functional monomer, halo-functional oligomer, carbonyl-functional monomer, carbonyl-functional oligomer, epoxy-functional monomer, epoxy-functional oligomer, poly-functional acrylic monomer, poly-functional acrylic oligomer, poly-functional methacrylic monomer, and poly-functional methacrylic oligomer, said element containing or forming upon drying an ethenically unsaturated moiety selected from the group consisting of acrylic, methacrylic, and enamine.

3. The amino-functional polymer of claim 1 which is soluble in hydrophilic solvent at pH values <8.

4. The amino-functional polymer of claim 3 in which at least some ethenic unsaturation is covalently bonded to the polymer before drying.

5. A mixture comprising the amino-functional polymer of claim 4, and at least one additional polymer selected from the group consisting of nonionic polymer and cationic polymer.

6. The mixture of claim 5 which further comprises at least one element selected from the group consisting of cross-linker, epoxy curing catalyst, coating process-facilitating adjuvant, cationic wax dispersion, nonionic wax dispersion, nonionic slip additive, cationic slip additive, cationic colloidal silica, mineral filler, plastic pigment, anti-static additive, UV absorber, UV stabilizer, biocide, and security taggant.

7. The mixture of claim 6 in which said cross-linker comprises at least one element selected from the group consisting of

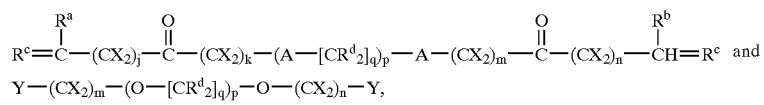

$$R^c = \overset{R^a}{\underset{|}{C}} - (CX_2)_j - \overset{O}{\underset{\|}{C}} - (CX_2)_k - (A - [CR^d{}_2]_q)_p - A - (CX_2)_m - \overset{O}{\underset{\|}{C}} - (CX_2)_n - \overset{R^b}{\underset{|}{CH}} = R^c \text{ and}$$

$$Y - (CX_2)_m - (O - [CR^d{}_2]_q)_p - O - (CX_2)_n - Y,$$

where Y is selected from the group consisting of halogen and three-membered oxirane ring, $R^a$ and $R^b$ are the same or different and selected from the group consisting of H and $C_1$ to $C_6$ alkyl, $R^c$ is selected from the group consisting of O and $CX_2$, each X can be the same or different and is selected from the group consisting of H, hydroxyl, and halogen, $R^d$ is selected from the group consisting of H, hydroxyl, halogen, and any organic radical containing at least one carbon atom, wherein each $R^d$ can be the same or different within the same molecule, A is selected from the group consisting of O and $NR^d$, $CR^d$ and $CR^d_2$ can each be a separate moiety or a portion of a cyclic structure, j, k, m and n are integers ranging from 0 to 6, q is an integer ranging from 1 to 6, inclusive, and p is an integer ranging from 0 to 30, inclusive.

8. The mixture of claim 5 wherein said additional polymer of claim 5 is a cationically stabilizable emulsion polymer with a calculated glass transition temperature that is <35° C. that comprises on a dry basis:
  i) 3 to 70 wt. % of at least one water-soluble polymeric compound having a number-average molecular weight >5000 which comprises a moiety selected from the group consisting of primary amines and secondary amines; and
  ii) 30 to 97 wt. % of a blend of vinylic, non-acidic monomers which are uncharged or positively charged in an aqueous solution having a pH between 1 and 8, which vinylic, non-acidic monomers include a) a nitrogen-containing monomer, b) a monomer that is either epoxy-functional or carbonyl-functional, and c) an acrylic or methacrylic ester.

9. The mixture of claim 8 wherein a) is selected from the group consisting of acrylonitrile and methacrylonitrile, b) is selected from the group consisting of glycidyl methacrylate, glycidyl acrylate, acetoacetoxyethyl methacrylate, acetoacetoxyethyl acrylate, acetoacetoxy (methyl)ethyl acrylate, acetoacetoxypropyl acrylate, acetoacetamidoethyl acrylate, acetoacetamidoethyl methacrylate, and acetoacetoxybutyl acrylate, and c) is selected from the group consisting of acrylate ester and methacrylate ester, said esters being made from alcohols of 1 to 8 carbon atoms.

10. The mixture of claim 9 wherein said blend of vinylic, non-acidic monomers comprises 5 to 25% a), 5 to 20% b), and 55 to 90% c), such that the calculated glass transition temperature of said additional polymer upon drying is <25° C. before cross-linking.

11. The amino-functional polymer of claim 1 which forms a hydrophilic solvent-based emulsion at pH values ≦8 and is unstable in hydrophilic solvent-based systems at pH values >8.

12. The amino-functional polymer of claim 11 in which removal of water shifts equilibria to favor the formation of ethenic unsaturation via condensation when said emulsion is dried in the presence of an unsaturation number enhancer element selected from the group consisting of

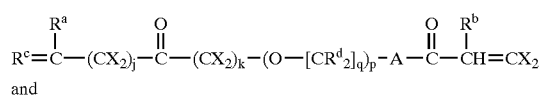
and
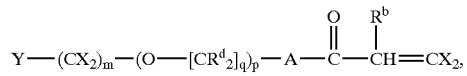

where Y is selected from the group consisting of halogen and three-membered oxirane ring, $R^a$ and $R^b$ are the same or different and selected from the group consisting of H and $C_1$ to $C_6$ alkyl, $R^c$ is selected from the group consisting of O and $CX_2$, each X can be the same or different and is selected from the group consisting of H, hydroxyl, and halogen, $R^d$ is selected from the group consisting of H, hydroxyl, halogen, and any organic radical containing at least one carbon atom, wherein each $R^d$ can be the same or different, A is selected from the group consisting of O and $NR^d$, $CR^d$ and $CR^d_2$ can each be a separate moiety or a portion of a cyclic structure, j, k, and m are integers ranging from 0 to 6, inclusive, q is an integer ranging from 1 to 6, inclusive, and p is an integer ranging from 0 to 30, inclusive.

13. A dryable mixture of said amino-functional polymer of claim 12, and an unsaturation number enhancer element that forms ethenic unsaturation within said amino-functional polymer upon drying.

14. The dryable mixture of claim 13 which further comprises at least one element selected from the group consisting of cationic polymer, nonionic polymer, cross-linker, epoxy curing catalyst, coating process-facilitating adjuvant, cationic wax dispersion, nonionic wax dispersion, nonionic slip additive, cationic slip additive, cationic colloidal silica, mineral filler, plastic pigment, anti-static additive, UV absorber, UV stabilizer, biocide, and security taggant.

15. The dryable mixture of claim 14 in which said cross-linker comprises at least one element of the following group of structures:

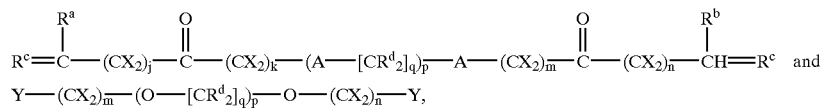

where Y is selected from the group consisting of halogen and three-membered oxirane ring, $R^a$ and $R^b$ are the same or different and selected from the group consisting of H and $C_1$ to $C_6$ alkyl, $R^c$ is selected from the group consisting of O and $CX_2$, each X can be the same or different and is selected from the group consisting of H, hydroxyl, and halogen, $R^d$ is selected from the group consisting of H, hydroxyl, halogen, and any organic radical containing at least one carbon atom, wherein each $R^d$ can be the same or different within the same molecule, A is selected from the group consisting of O and $NR^d$, $CR^d$ and $CR^d_2$ can each be a separate moiety or a portion of a cyclic structure, j, k, m and n are integers ranging from 0 to 6, q is an integer ranging from 1 to 6, inclusive, and p is an integer ranging from 0 to 30, inclusive.

16. The dryable mixture of claim 15 wherein in said cross-linker, Y is a three-membered oxirane ring, A is oxygen, X and $R^d$ are hydrogen, $R^a$ and $R^b$ are the same or different and are selected from hydrogen or methyl, $R^c$ is oxygen, n is equal to 1, q is equal to 2, m equals 1 or 2, and p is ≦10.

17. The dryable mixture of claim 14 wherein in said unsaturation number enhancer element, Y is a three-membered oxirane ring, A is oxygen, $R^a$ and $R^b$ are the same or different and selected from hydrogen and methyl, $R^c$ is oxygen, X and $R^d$ are hydrogen, n is equal to 1, q is equal to 2, m equals 1 or 2, and p is ≦10.

18. The dryable mixture of claim 14 wherein said amino-functional polymer is a cationically stabilizable emulsion polymer with a calculated glass transition temperature <35° C. that comprises on a dry basis:
i) 3 to 70 wt. % of at least one water-soluble polymeric compound having a number-average molecular weight >5000 which comprises a moiety selected from the group consisting of primary amines and secondary amines; and
ii) 30 to 97 wt. % of a blend of vinylic, non-acidic monomers which are uncharged or positively charged in an aqueous solution having a pH between 1 and 8, which vinylic, non-acidic monomers include a) a nitrogen-containing monomer, b) a monomer that is either epoxy-functional or carbonyl-functional, and c) an acrylic or methacrylic ester.

19. The dryable mixture of claim 18 having said blend of vinylic, non-acidic monomers wherein a) is selected from the group consisting of acrylonitrile and methacrylonitrile, b) is selected from the group consisting of glycidyl methacrylate, glycidyl acrylate, acetoacetoxyethyl methacrylate, acetoacetoxyethyl acrylate, acetoacetoxy (methyl)ethyl acrylate, acetoacetoxypropyl acrylate, acetoacetamidoethyl acrylate, acetoacetamidoethyl methacrylate, and acetoacetoxybutyl acrylate, and c) is selected from the group consisting of acrylate esters and methacrylate esters, said esters being made from alcohols of 1 to 8 carbon atoms.

20. The dryable mixture of claim 19 wherein said blend of vinylic, non-acidic monomers comprises 5 to 25% a), 5 to 20% b), and 55 to 90% c), such that the calculated glass transition temperature of said dried polymer is <25° C. before cross-linking.

21. The amino-functional polymer of claim 2 wherein said element is selected from the group consisting of 2-hydroxy-3-chloropropylacrylate, glycidyl methacrylate (GMA), glycidyl acrylate, acetoacetoxyethyl methacrylate (AAEM), acetoacetoxyethyl acrylate, acetoacetoxy (methyl)ethyl acrylate, acetoacetoxypropyl acrylate, acetoacetamidoethyl acrylate, acetoacetamidoethyl methacrylate, and acetoacetoxybutyl acrylate.

22. The amino-functional polymer of claim 1 which comprises an amino-functional styrenated acrylic polymer with a number-average molecular weight ranging from 5,000 to 80,000 daltons and a weight-average molecular weight of 10,000 to 200,000 daltons.

23. The amino-functional polymer of claim 2 which comprises an amino-functional styrenated acrylic polymer with a number-average molecular weight ranging from 8,000 to 20,000 daltons and a weight-average molecular weight of 15,000 to 50,000 daltons.

24. The amino-functional polymer of claim 2 wherein said element is selected from the group consisting of 2-hydroxy-3-chloropropylacrylate, glycidyl methacrylate (GMA), glycidyl acrylate, and acetoacetoxyethyl methacrylate (AAEM).

25. The amino-functional polymer of claim 2 wherein said element is present in an amount sufficient to consume >50% of reactive amine hydrogens of said amino-functional polymer.

26. The amino-functional polymer of claim 2 wherein said element is present in an amount sufficient to consume ≧90% of said reactive amine hydrogens of the amino-functional polymer.

27. A coating composition for plastic film which composition contains
a) 70 to 99 wt. % of the amino-functional polymer of claim 12; and
b) 1 to 30 wt. % of an unsaturation number enhancer element selected from the group consisting of

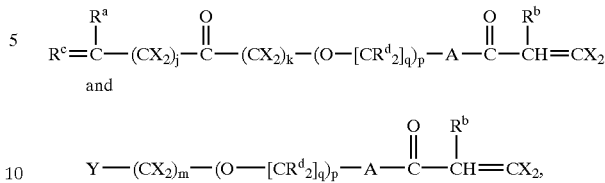

and $$Y-(CX_2)_m-(O-[CR^d{}_2]_q)_p-A-\overset{O}{\underset{\|}{C}}-\overset{R^b}{\underset{|}{CH}}=CX_2,$$

where Y is selected from the group consisting of halogen and three-membered oxirane ring, $R^a$ and $R^b$ are the same or different and selected from the group consisting of H and $C_1$ to $C_6$ alkyl, $R^c$ is selected from the group consisting of O and $CX_2$, each X can be the same or different and is selected from the group consisting of H, hydroxyl, and halogen, $R^d$ is selected from the group consisting of H, hydroxyl, halogen, and any organic radical containing at least one carbon atom, wherein each $R^d$ can be the same or different, A is selected from the group consisting of O and $NR^d$, $CR^d$ and $CR^d{}_2$ can each be a separate moiety or a portion of a cyclic structure, j, k, and m are integers ranging from 0 to 6, inclusive, q is an integer ranging from 1 to 6, inclusive, and p is an integer ranging from 0 to 30, inclusive.

28. The coating composition of claim 27 wherein said amino-functional polymer is a condensation product of a reaction between an amino-functional polymer comprising reactive amine hydrogens with an element selected from the group consisting of halo-functional monomer, halo-functional oligomer, carbonyl-functional monomer, carbonyl-functional oligomer, epoxy-functional monomer, epoxy-functional oligomer, poly-functional acrylic monomer, poly-functional acrylic oligomer, poly-functional methacrylic monomer, and poly-functional methacrylic oligomer, said element containing or forming upon drying an ethenically unsaturated moiety selected from the group consisting of acrylic, methacrylic, and enamine.

29. The coating composition of claim 27 which further comprises at least one element selected from the group consisting of coating process-facilitating adjuvant, nonionic wax dispersion, cationic wax dispersion, nonionic slip additive, cationic slip additive, cationic colloidal silica, mineral filler, plastic pigment, cross-linking compound, curing catalyst, anti-static additive, and security taggant.

30. A coating composition for plastic film which comprises
a) 1 to 50 wt. % of the amino-functional polymer of claim 4, and
b) 50 to 99 wt. % of at least one additional polymer selected from the group consisting of nonionic polymer and cationic polymer.

31. The coating composition of claim 30 wherein said amino-functional polymer is a condensation product of a reaction between an amino-functional polymer comprising reactive amine hydrogens with an element selected from the group consisting of halo-functional monomer, halo-functional oligomer, carbonyl-functional monomer, carbonyl-functional oligomer, epoxy-functional monomer, epoxy-functional oligomer, poly-functional acrylic monomer, poly-functional acrylic oligomer, poly-functional methacrylic monomer, and poly-functional methacrylic oligomer, said element containing or forming upon drying an ethenically unsaturated moiety selected from the group consisting of acrylic, methacrylic, and enamine.

32. The coating composition of claim 30 which further comprises at least one element selected from the group consisting of coating process-facilitating adjuvant, nonionic wax dispersion, cationic wax dispersion, nonionic slip additive, cationic slip additive, cationic colloidal silica, mineral filler, plastic pigment, cross-linking compound, curing catalyst, anti-static additive, and security taggant.

33. A plastic film which comprises
A) a plastic substrate layer and
B) a coating comprising the coating composition of claim 27.

34. The plastic film of claim 33 which further comprises an ink print image on a surface of said coating opposite from said plastic substrate layer.

35. A plastic film which comprises
A) a plastic substrate layer and
B) a coating comprising the coating composition of claim 30.

36. A curable mixture comprising
i) polymeric amine having a number-average molecular weight of >3000 and covalently bonded side chains of at least one of a) ethenically unsaturated moieties selected from the group consisting of acrylic, methacrylic, and enamine, and b) precursors of ethenically unsaturated moieties selected from the group consisting of 2-hydroxy-3-chloropropylacrylate, glycidyl methacrylate (GMA), glycidyl acrylate, acetoacetoxyethyl methacrylate (AAEM), acetoacetoxyethyl acrylate, acetoacetoxy (methyl)ethyl acrylate, acetoacetoxypropyl acrylate, acetoacetamidoethyl acrylate, acetoacetamidoethyl methacrylate, and acetoacetoxybutyl acrylate;
ii) epoxy cross-linking catalyst; and
iii) cross-linking agent.

37. The curable mixture of claim 36 wherein said polymeric amine is a condensation product made by reacting an amino-functional polymer comprising reactive amine hydrogens with an element selected from the group consisting of halo-functional monomer, halo-functional oligomer, carbonyl-functional monomer, carbonyl-functional oligomer, acrylic-functional monomer, acrylic-functional oligomer, methacrylic-functional monomer, methacrylic-functional oligomer, epoxy-functional monomer, and epoxy-functional oligomer, said element containing an ethenically unsaturated moiety selected from the group consisting of acrylic and methacrylic.

38. The curable mixture of claim 37 wherein said amino-functional polymer is soluble in hydrophilic solvent at pH values $\leq 8$ and is insoluble at pH values >8.

39. The curable mixture of claim 37 wherein said amino-functional polymer forms a water-based emulsion at pH values $\leq 8$ and is unstable in water at pH values >8.

* * * * *

UNITED STATES PATENT AND TRADEMARK OFFICE
CERTIFICATE OF CORRECTION

PATENT NO. : 6,893,722 B2
APPLICATION NO. : 10/134969
DATED : May 17, 2005
INVENTOR(S) : Dennis E. McGee It is certified that error appears in the above-identified patent and that said Letters Patent is hereby corrected as shown below:

Column 6, the first formula, that portion of the formula reading "-CH($R^b$)=$R^c$" should read --C($R^b$)=$R^c$--
Column 8, line 3, that portion of the formula reading "-CH($R^b$)=$CX_2$" should read --C($R^b$)=$CX_2$--
Column 8, line 8, that portion of the formula reading "-CH($R^b$)=$CX_2$" should read --C($R^b$)=$CX_2$--
Column 8, line 47, that portion of the formula reading "-CH($R^b$)=$R^c$" should read --C($R^b$)=$R^c$--
Column 10, line 10, that portion of the formula reading "-CH($R^b$)=$CX_2$" should read --C($R^b$)=$CX_2$--
Column 10, line 14, that portion of the formula reading "-CH($R^b$)=$CX_2$" should read --C($R^b$)=$CX_2$--
Column 15, line 18, that portion of the formula reading "-CH($R^b$)=$R^c$" should read --C($R^b$)=$R^c$--
Claim 7 at Column 30, line 58, that portion of the formula reading "-CH($R^b$)=$R^c$" should read --C($R^b$)=$R^c$--
Claim 12 at Column 31, line 59, that portion of the formula reading "-CH($R^b$)=$CX_2$" should read --C($R^b$)=$CX_2$--
Claim 12 at Column 31, line 64, that portion of the formula reading "-CH($R^b$)=$CX_2$" should read --C($R^b$)=$CX_2$--
Claim 15 at Column 32, line 37, that portion of the formula reading "-CH($R^b$)=$R^c$" should read --C($R^b$)=$R^c$--
Claim 12(b) at Column 34, line 5, that portion of the formula reading "-CH($R^b$)=$CX_2$" should read --C($R^b$)=$CX_2$--

UNITED STATES PATENT AND TRADEMARK OFFICE
CERTIFICATE OF CORRECTION

PATENT NO. : 6,893,722 B2
APPLICATION NO. : 10/134969
DATED : May 17, 2005
INVENTOR(S) : Dennis E. McGee It is certified that error appears in the above-identified patent and that said Letters Patent is hereby corrected as shown below:

Claim 12(b) at Column 34, line 10, that portion of the formula reading "-CH($R^b$)=$CX_2$" should read --C($R^b$)=$CX_2$--

Signed and Sealed this

Twenty-second Day of January, 2008

JON W. DUDAS
*Director of the United States Patent and Trademark Office*